US012795744B2

(12) United States Patent
Patchava et al.

(10) Patent No.: US 12,795,744 B2
(45) Date of Patent: Nov. 10, 2026

(54) RANDOM ACCESS RESOURCE SELECTION BASED ON SAMPLING FREQUENCY OFFSET

(71) Applicant: QUALCOMM Incorporated, San Diego, CA (US)

(72) Inventors: Raviteja Patchava, San Diego, CA (US); Piyush Gupta, Bridgewater, NJ (US); Xiaoxia Zhang, San Diego, CA (US); Kazuki Takeda, Minato-ku (JP)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 18/796,273

(22) Filed: Aug. 6, 2024

(65) Prior Publication Data

US 2026/0046931 A1 Feb. 12, 2026

(51) Int. Cl.

| | |
|---|---|
| ***H04W 74/0833*** | (2024.01) |
| ***H04W 74/00*** | (2009.01) |
| ***H04W 74/04*** | (2009.01) |
| ***H04W 74/08*** | (2009.01) |

(52) U.S. Cl.

CPC ..... *H04W 74/0833* (2013.01); *H04W 74/002* (2013.01); *H04W 74/04* (2013.01); *H04W 74/0866* (2013.01)

(58) Field of Classification Search

None

See application file for complete search history.

(56) References Cited

U.S. PATENT DOCUMENTS

| | | | |
|---|---|---|---|
| 7,782,752 B2 * | 8/2010 | Gupta | H04L 27/2675 370/208 |
| 8,773,968 B2 * | 7/2014 | Jiang | H04J 13/0074 370/252 |

(Continued)

FOREIGN PATENT DOCUMENTS

| | | | |
|---|---|---|---|
| CN | 120434815 A * | 8/2025 | H04L 5/00 |
| WO | WO-2021078007 A1 * | 4/2021 | H04L 5/0005 |

OTHER PUBLICATIONS

3GPP TSG RAN WG1 #116bis, Moderator (Spreadtrum Communications), "FL summary#2 on CW waveform characteristics for A-IoT," Changsha, Hunan Province, China, Apr. 15-91, 2024, R1-24XXXX.*

(Continued)

*Primary Examiner* — Andrew C Oh

(74) *Attorney, Agent, or Firm* — Holland & Hart LLP/QUALCOMM Incorporated

(57) ABSTRACT

Methods, systems, and devices for wireless communications are described. A reader device may communicate with multiple ambient internet of things (A-IoT) devices. The reader device and the ambient devices may implement random access procedures. The reader device may transmit a query message (a msg0) that allocates random access resources for the A-IoT devices to transmit a random access message (a msg1). The query message may indicate sampling frequency offset (SFO) demands associated with the random access resources. The A-IoT devices may select random access resources for transmission of random access messages (e.g., msg1s) based on the SFOs of the A-IoT devices and the indicated SFO demands associated with the random access resources.

20 Claims, 16 Drawing Sheets

(56) References Cited

U.S. PATENT DOCUMENTS

| | | | | |
|---|---|---|---|---|
| 2013/0088973 | A1* | 4/2013 | Yang | H04L 5/003 370/241 |
| 2020/0015266 | A1* | 1/2020 | Yan | H04W 74/002 |
| 2020/0267678 | A1* | 8/2020 | Eom | H04L 7/00 |
| 2022/0006482 | A1* | 1/2022 | He | H04L 69/22 |
| 2025/0314757 | A1* | 10/2025 | Liu | A61B 5/0507 |
| 2026/0006393 | A1* | 1/2026 | Falk | H04S 7/302 |

OTHER PUBLICATIONS

3GPP TR 38.848 v18.0.0 Study on Ambient IoT in RAN (Sep. 2023).*

3GPP TR 38.769 V0.0.1 "Study on solutions for ambient IoT (Internet of Things)" (Feb. 2024).*

3GPP TS 22.369 V19.2.0 "Service requirements for ambient power-enabled IoT" (Jun. 2024).*

International Search Report and Written Opinion PCT/US2025/040190 ISA/EPO Oct. 28, 2025.

Lei H (Lenovo)., et al., "Discussion on Frame Structure and Physical Layer Procedures for Ambient IoT", 3GPP TSG RAN WG1 #117, R1-2404219, Type Discussion, PS_AMBIENT_IOT_SOLUTIONS, 3rd Generation Partnership Project (3GPP), Mobile Competence Centre, 650, Route Des Lucioles, F-06921 Sophia-Antipolis Cedex, France, vol. RAN WG1, No. Fukuoka City, Fukuoka, JP, May 20, 2024-May 24, 2024, May 10, 2024, 16 Pages, XP052608525, p. 9-p. 11.

Wang M (Ericsson)., et al., "Discussion on UL Multiple Access", 3GPP TSG-RAN WG2 #125bis, R2-2402951, Type Discussion, FS Ambient Iot Solutions, 3rd Generation Partnership Project (3GPP), Mobile Competence Centre, 650, Route Des Lucioles, F-06921 Sophia-Antipolis Cedex, PRAN, vol. RAN WG2, No. Changsha, Hunan Province, CN, Apr. 15, 2024-Apr. 19, 2024, Apr. 5, 2024, 7 Pages, XP052584905, p. 3-p. 5.

* cited by examiner

1600

RANDOM ACCESS RESOURCE SELECTION BASED ON SAMPLING FREQUENCY OFFSET

FIELD OF TECHNOLOGY

The following relates to wireless communications, including random access resource selection based on sampling frequency offset.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The systems, methods, and devices of this disclosure each have several innovative aspects, no single one of which is solely responsible for the desirable attributes disclosed herein.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Figure 1:
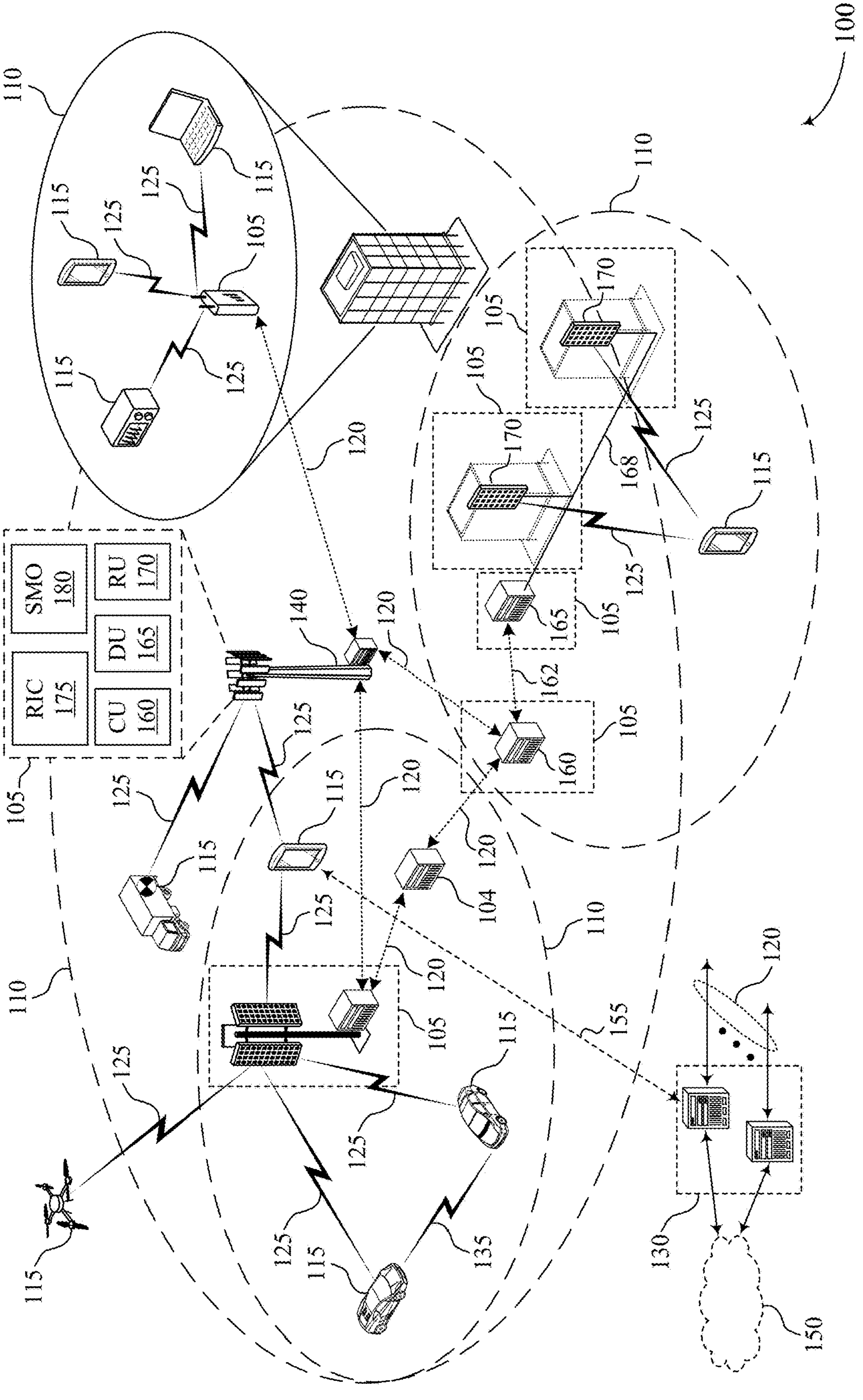
FIG. 1 shows an example of a wireless communications system that supports random access resource selection based on sampling frequency offset (SFO) in accordance with one or more aspects of the present disclosure.

Some wireless communications systems may support deployment of ambient internet of things (A-IoT) devices, which may include relatively low power and low complexity devices that are capable of harvesting energy from different sources, such as radio frequency waves, solar energy, heat, or other ambient sources. A-IoT devices may be used for applications such as inventory tracking, sensing, positioning, or command systems. For example, for command systems, A-IoT devices may be used for such applications as control of irrigations systems, dispensing medicine, or providing alerts. An A-IoT device may communicate with another wireless communication device (e.g., a reader device) via backscatter based communication. For example, the ambient device may receive a waveform (e.g., from the reader device), which may activate the A-IoT device (e.g., activate one or more radio frequency (RF) chains or components of the A-IoT device), and which the A-IoT device may use to send a backscattered signal modulated with data. Accordingly, A-IoT devices may also be referred to as energy-harvesting (EH)-capable devices. Reader devices may be network entities, user equipments (UEs), or other network devices.

The reader device and the A-IoT devices may implement various types of communication procedures to support the various applications. For example, the reader device and the ambient devices may implement random access procedures (e.g., for inventory purposes or for initial connection in order to communicate data). For example, the reader device may transmit a query message (a msg0) that allocates random access resources for the A-IoT devices to transmit a random access message (a msg1). The A-IoT devices that match the query message may transmit a msg1 using one of the indicated random access resources. The reader device may respond to the msg1s via a msg2 that allocates additional resources to the A-IoT devices. The random access resources may be allocated in a time division multiplexing (TDM), frequency division multiplexing (FDM), or code division multiplexing (CDM) fashion. As the A-IoT devices may be low complexity devices, the A-IoT devices may suffer from sampling frequency offset (SFO) (e.g., because the A-IoT devices may not monitor for synchronization signals such as primary synchronization signals (PSSs) or secondary synchronization signals (SSSs) to synchronize timing with the reader device). SFO may introduce non-orthogonality in CDM, and thus may impact the quantity of A-IoT devices which may multiplex msg1s using CDM in a random access resource.

Aspects of this disclosure relate to selection of random access resources for transmission of random access messages (e.g., msg1s) based on the SFOs of the A-IoT devices. For example, different device types or classes of A-IoT devices may have different SFO demands (e.g., $10^5$ parts per million (ppm), $10^4$ ppm, $10^3$ ppm). The query message (e.g., the msg0) transmitted by the reader device may indicate the SFO demands associated with each random access resource. Accordingly, the A-IoT devices may select a random access resource that matches the SFO demands of the A-IoT devices. By grouping A-IoT devices based on SFO demands, random access resources may be used to multiplex a larger quantity of random access messages (e.g., msg1s using CDM).

Aspects of the disclosure are initially described in the context of wireless communications systems. Aspects of the disclosure are further illustrated by and described with reference to random access resource diagrams, process flows, apparatus diagrams, system diagrams, and flowcharts that relate to random access resource selection based on SFO.

FIG. 1 shows an example of a wireless communications system 100 that supports random access resource selection based on SFO in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may include A-IoT devices, for example, to reduce energy costs and increase an economic efficiency of the wireless communications system 100. A-IoT devices in the wireless communications system 100 may be used for applications such as inventory tracking, sensing, positioning, or command systems. A-IoT devices may be examples of UEs 115 as described herein. An A-IoT device may be an EH-capable device capable of performing backscatter based communication (e.g., may transmit data) via backscattering an interrogating signal received from another wireless communications device (e.g., a network device which may be referred to as a reader device). For example, a reader device may be a UE 115 or a network entity 105 as described herein. An interrogating signal may be a continuous wave signal that does not carry data.

A-IoT devices may include radio frequency identification (RFID) devices, also referred to as RFID tags. An RFID tag may include an envelope detector and may backscatter modulate a carrier wave (e.g., an interrogating signal) from a reader device. Another type of A-IoT device may be a zero power (ZP) IoT device. A ZP IoT device may communicate with a network entity 105 using a UE 115 as a relay. For example, a UE 115 may transmit commands or interrogating signals to a ZP IoT device and may receive responses from (e.g., backscatter responses) a ZP IoT device. The UE 115 may receive the commands from a network entity 105 and/or may relay responses from ZP IoT devices onto a network entity 105. A ZP IoT device may include an energy storage mechanism, such as a capacitor or battery, and thus a ZP IoT device may be an active device. A device that communicates with an A-IoT device may be referred to as a network device, a wireless communication device, or a reader device.

A-IoT devices may be passive, semi-passive, or active. Table 1 below shows characteristics of passive, semi-passive, and active A-IoT devices. Example applications for passive A-IoT devices include access or proximity cards. Example applications for semi-passive A-IoT devices include electronic tolls or pallet tracking. Example applications for active A-IoT devices include large asset tracking or livestock tracking.

TABLE 1

| EH-Capable Device Type | Passive | Semi-Passive | Active |
| --- | --- | --- | --- |
| Power Source | Harvesting energy (e.g., RF energy, solar, heat) | Harvesting energy (e.g., RF energy, solar, heat), battery | Harvesting energy (e.g., RF energy, solar, heat), battery |
| Communication type | Response only | Response only | Respond or initiate |
| Approximate Maximum Range | 10M | >100M | >100M |

In some examples, a wireless communication device (e.g., a reader device) may communicate with multiple A-IoT devices via multiplexed communications (e.g., via FDM, TDM, and/or CDM). In some examples, the reader device and the A-IoT devices may implement various types of communication procedures to support the various applications. For example, the reader device and the A-IoT devices may implement random access procedures (e.g., for inventory purposes or for initial connection in order to communicate data). For example, the reader device may transmit a query message (a msg0) that allocates random access resources for the A-IoT devices to transmit a random access message (a msg1). The A-IoT devices that match the query message may transmit a msg1 using one of the indicated random access resources. The reader device may respond to the msg1s via a msg2 that allocates additional resources to the A-IoT devices. As the A-IoT devices may be low complexity devices, the A-IoT devices may suffer from SFO, which may introduce non-orthogonality and may reduce the amount of A-IoT devices from which the reader device may successfully receive multiplexed messages (e.g., msg1s).

Accordingly, random access resources may be selected by the A-IoT devices based on the SFO demands of the A-IoT devices. For example, different device types or classes of A-IoT devices may have different SFO demands (e.g., $10^5$ ppm, $10^4$ ppm, $10^3$ ppm). The query message (e.g., the msg0) transmitted by the reader device may indicate the SFO demands associated with each random access resource. Accordingly, the A-IoT devices may select a random access resource that matches the SFO demands of the A-IoT devices. By grouping A-IoT devices based on SFO demands, random access resources may be used to multiplex a larger quantity of random access messages (e.g., msg1s) by matching A-IoT devices with similar SFO demands.

Figure 2:
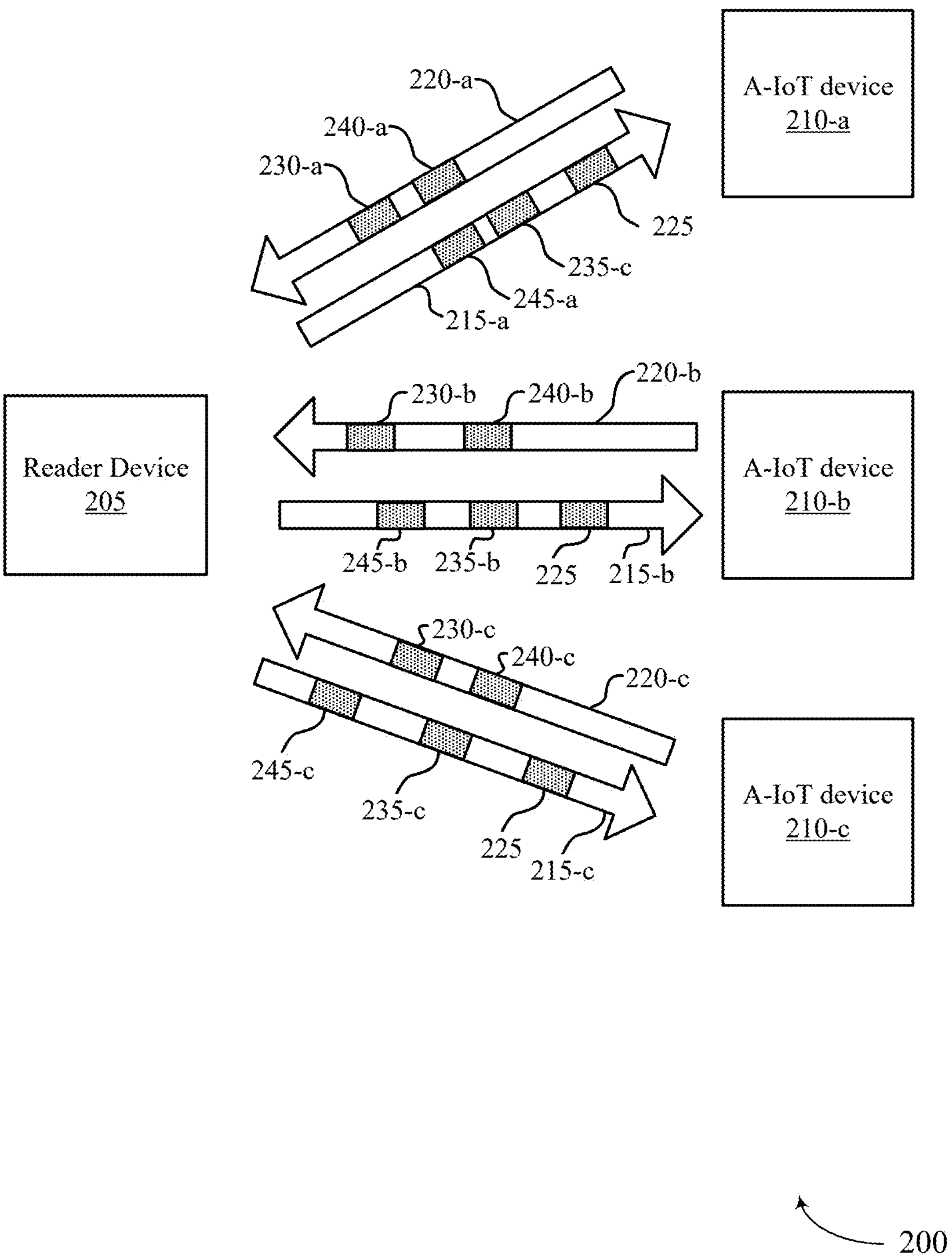
FIG. 2 shows an example of a wireless communications system that supports random access resource selection based on SFO in accordance with one or more aspects of the present disclosure.

FIG. 2 shows an example of a wireless communications system 200 that supports random access resource selection based on SFO in accordance with one or more aspects of the present disclosure. The wireless communications system 200 may implement or may be implemented by aspects of the wireless communications system 100.

The wireless communications system 200 may include a reader device 205, an A-IoT device 210-*a*, an A-IoT device 210-*b*, and an A-IoT device 210-*c*. The A-IoT device 210-*a*, the A-IoT device 210-*b*, and the A-IoT device 210-*c* may be examples of UEs 115 as described herein. The A-IoT device 210-*a*, the A-IoT device 210-*b*, and the A-IoT device 210-*c* may be capable of performing backscattering based communication. In some aspects, the A-IoT devices 210 may be examples of an IoT device (such as an A-IoT device), an RFID tag, or any combination thereof. In some examples, the reader device 205 may be a network entity 105 as described herein. In some examples, the reader device 205 may be a UE 115 as described herein, and the reader device may communicate with a network entity 105 using a communication link 125 as described herein.

The reader device 205 may transmit communications to the A-IoT device 210-*a* via the forward link 215-*a* and the reader device 205 may receive communications from the A-IoT device 210-*a* via the backward link 220-*a*. The reader device 205 may transmit communications to the A-IoT device 210-*b* via the forward link 215-*b* and the reader device 205 may receive communications from the A-IoT device 210-*b* via the backward link 220-*b*. The reader device 205 may transmit communications to the A-IoT device 210-*c* via the forward link 215-*c* and the reader device 205 may receive communications from the A-IoT device 210-*c* via the backward link 220-*c*.

The reader device 205 may initiate an inventory procedure or a random access procedure with the A-IoT devices 210 via transmission of a query message 225. The A-IoT devices 210 that match with the query message 225 may transmit respective random access messages 230. For example, the A-IoT device 210-*a* may transmit a random access message 230-*a*, the A-IoT device 210-*b* may transmit a random access message 230-*b*, and the A-IoT device 210-*c* may transmit a random access message 230-*c*. The query message 225 may allocate random access resources available for the random access messages 230 from the A-IoT devices 210. For example, the random access resources may be TDM or FDM resources, and the random access messages 230 (e.g., msg1s) may be transmitted using TDM, FDM, and/or CDM. In response to the random access messages 230, the reader device 205 may transmit msg2s 235 to the A-IoT devices 210 that may allocate additional resources to the A-IoT devices. For example, the reader device 205 may transmit a msg2 235-*a* to the A-IoT device 210-*a* that allocates resources for a msg3 240-*a*, the reader device 205 may transmit a msg2 235-*b* to the A-IoT device 210-*b* that allocates resources for a msg3 240-*b*, and the reader device 205 may transmit a msg2 235-*c* to the A-IoT device 210-*c* that allocates resources for a msg3 240-*c*. The A-IoT devices 210 may transmit msg3s 240 using the resources allocated by the msg2s. The msg3s may indicate the identifiers (IDs) such as the electronic product code (EPC) ID for the A-IoT devices 210. For example, the A-IoT device 210-*a* may transmit a msg3 240-*a* that indicates the EPC ID of the A-IoT device 210-*a*, the A-IoT device 210-*b* may transmit a msg3 240-*b* that indicates the EPC ID of the A-IoT device 210-*b*, and the A-IoT device 210-*c* may transmit a msg3 240-*c* that indicates the EPC ID of the A-IoT device 210-*c*. The reader device 205 may complete the inventory procedure or the random access procedure by transmitting acknowledgments 245 to the A-IoT devices 210. For example, the reader device 205 may transmit an acknowledgment 245-*a* to the A-IoT device 210-*a* that indicates the EPC ID for the A-IoT device 210-*a*, the reader device 205 may transmit an acknowledgment 245-*b* to the A-IoT device 210-*b* that indicates the EPC ID for the A-IoT device 210-*b*, and the reader device 205 may transmit an acknowledgment 245-*c* to the A-IoT device 210-*c* that indicates the EPC ID for the A-IoT device 210-*c*.

The A-IoT devices 210 may apply different frequency shifts to the interrogating signals in order to FDM the random access messages 230. The A-IoT devices 210 may use binary orthogonal sequences for transmitting msg1s (e.g., the random access messages 230) using CDM, for example, as the A-IoT devices 210 may not support complex waveforms such as physical random access channel transmissions due to cost and complexity. Pseudo-random noise (PN) sequences such as Gold or Golay sequences may be used for CDM by A-IoT devices (e.g., for CDM of the random access messages 230).

As the A-IoT devices 210 may be low-cost and low-complexity devices, A-IoT transmissions may suffer from SFO between the A-IoT devices 210 and the reader device 205. SFO may introduce non-orthogonality between sequences in CDM and accordingly may negatively impact performance. For example, SFO may limit the maximum length of the sequence that may be supported for CDM. For example, SFO may have a coherence time, and performance may be severely degraded if the sequence length exceeds the coherence time. Additionally, or alternatively, SFO may limit the maximum quantity of sequences that may be used for msg1 as SFO may impact the probability of false alarm. Additionally, or alternatively, SFO may limit the maximum quantity of users that may be simultaneously transmitted on the same time/frequency resource in CDM. For example, with an SFO of $10^3$ ppm, a maximum sequence length of 63 bits may be supported, and a total of 128 different Gold sequences may be used for a maximum of 13 users. With an SFO of $10^4$ ppm, a maximum sequence length of 31 bits may be supported, and a total of 64 different Gold sequences may be used for a maximum of 4 users. With an SFO of $10^5$ ppm, CDM may not be supported due to large SFO error. Accordingly, CDM capacity is higher if SFO is lower (e.g., the SFO demand is stricter).

Different A-IoT devices 210 may have different SFO requirements or demands. For example, A-IoT device type one may have an SFO demand of $10^4$ ppm and A-IoT device type two may have an SFO demand of $10^3$ ppm. CDM capacity for msg1 (e.g., for CDM of the random access messages 230) may be improved by allocating random access resources based on the SFO demands of the A-IoT devices 210.

Accordingly, the query message 225 may indicate the SFO demands associated with each random access resource scheduled by the query message 225. The A-IoT devices 210 may select the random access resources for transmission of the random access messages 230 based on the indicated SFO demands associated with the random access resources and the SFO demands for the A-IoT devices 210. In some examples, an A-IoT device 210, for example, the A-IoT device 210-*a*, may select the subset of random access resources allocated by the query message 225 for which the A-IoT device 210-*a* satisfies the indicated SFO demand. The A-IoT device 210-*a* may randomly select a random access resource for transmission of the random access message 230-*a* from the selected subset of random access resources. For example, if the A-IoT device 210-*a* has an SFO of $10^4$ ppm, the A-IoT device 210-*a* may select the subset of random access resources indicated as being associated with the SFO demand of greater than or equal to $10^4$ ppm (e.g., equal to or less strict than the $10^4$ ppm demand). As another example, if the A-IoT device 210-*a* has an SFO of $10^5$ ppm, the A-IoT device 210-*a* may select the subset of random access resources indicated as being associated with the SFO demand of greater than or equal to $10^5$ ppm (e.g., equal to or less strict than the $10^5$ ppm demand).

In some examples, the query message 225 may indicate the SFO demands associated with the random access resources via indicating types or classes of A-IoT devices 210 that may transmit in each of the random access resources. For example, different types or classes of A-IoT devices 210 may have different SFOs, and a given A-IoT device 210 may determine whether a random access resource is available to the given A-IoT device 210 based on the device type or class of the given A-IoT device 210.

In some examples, the query message 225 may indicate the length of the sequences and/or the total quantity of sequences that can be used for each of the random access resources allocated by the query message. Accordingly, the A-IoT devices 210 may transmit the random access messages 230 using the indicated sequence lengths and/or CDM parameters that match the indicated sequence lengths and quantity of sequences for the selected random access resources. For example, with Gold sequences, the reader device 205 may indicate in the query message 225 the maximum cyclic shift that may be applied on preferred m-sequence pairs to generate gold sequences for transmission.

In some examples, for very high SFOs (e.g., for $10^5$ ppm) that do not support CDM, the reader device 205 may not allow CDM between different users (e.g., the reader device 205 may not allow A-IoT devices 210 to multiplex transmissions on such high SFO random access resources). For example, the query message 225 may indicate for high SFO demand random access resources that the total quantity of sequences allowed is equal to one.

Figure 3:
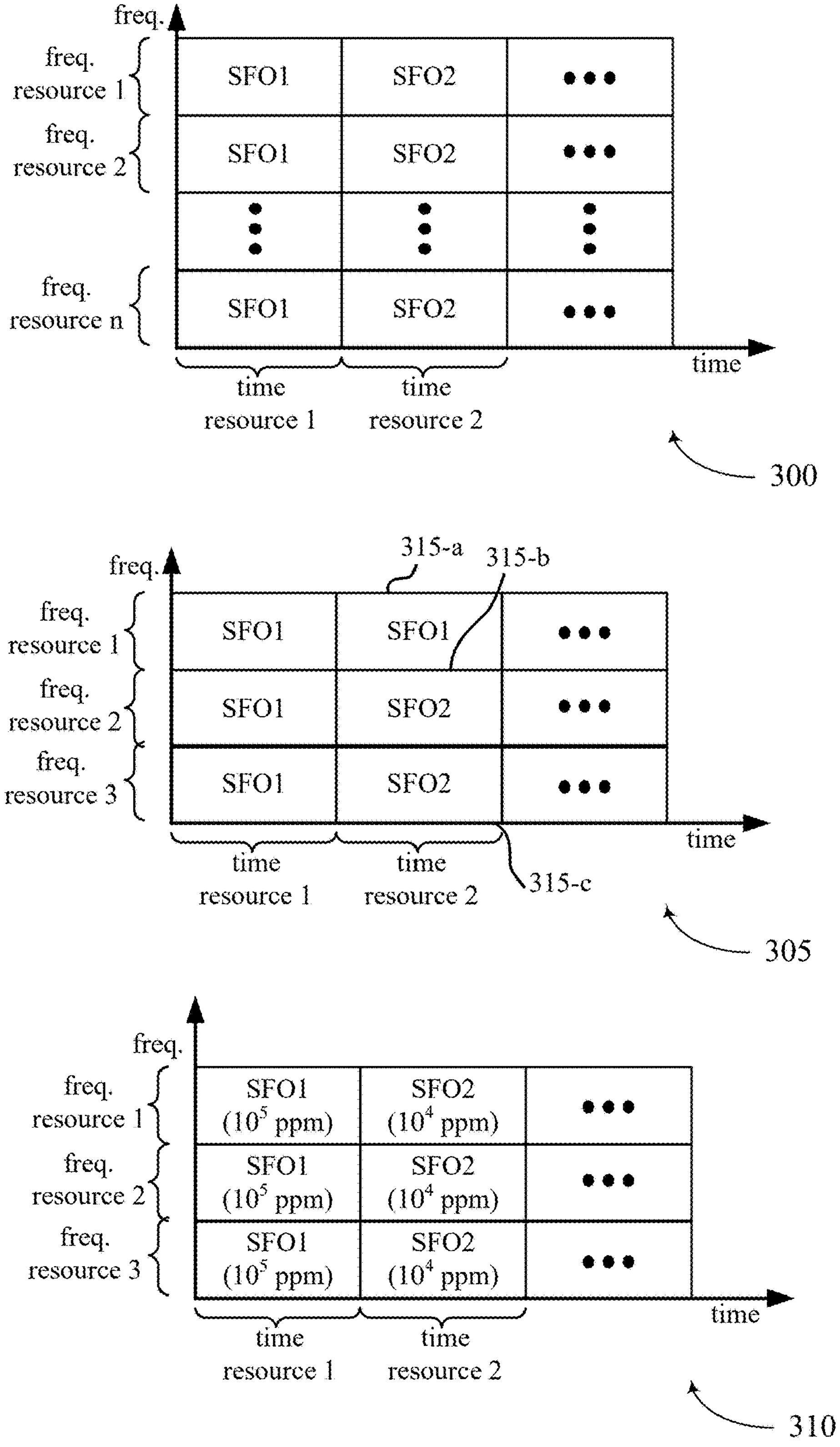
FIG. 3 shows an example of random access resource that supports random access resource selection based on SFO in accordance with one or more aspects of the present disclosure.

FIG. 3 shows examples of a random access resource diagram 300, a random access resource diagram 305, and a random access resource diagram 310 that support random access resource selection based on SFO in accordance with one or more aspects of the present disclosure. The random access resource diagram 300, the random access resource diagram 305, and the random access resource diagram 310 may implement or may be implemented by aspects of the wireless communications system 100 or the wireless communications system 200.

As described herein, a query message (e.g., the query message 225) may indicate the SFO demands for the random access resources allocated by the query message. In some examples, as different SFO demands may allow different lengths of CDM sequences, the same SFO demands may be allocated within the different frequency resources of the same time resource, as shown in the random access resource diagram 300. For example, as shown in the random access resource diagram 300, each of the frequency resources (e.g., frequency resource 1, frequency resource 2, . . . , frequency resource n) in the time resource 1 may have a first SFO demand (e.g., SFO demand 1). Similarly, each of the frequency resources (e.g., frequency resource 1, frequency resource 2, . . . , frequency resource n) in the time resource 2 may have a second SFO demand (e.g., SFO demand 2). Allocating the same SFO demand to each frequency resource in the same time resource as shown in the random access resource diagram 300 may minimize FDM interference between msg1 transmissions. For example, as smaller SFO transmissions may only work with lower interference conditions due to high capacity, FDM with higher SFO transmissions may result in high interference for lower SFO transmissions.

In some examples, as shown in the random access resource diagram 305, the same time resource (e.g., the time resource 2) may have frequency resources with different SFO demands. For example, the random access resource 315-*a* in time resource 2 and frequency resource 1 may have an SFO demand 1, and the random access resources 315-*b* and 315-*c* in time resource 2 and frequency resources 2 and 3, respectively, may have an SFO demand 2. The SFO demand 1 may be less strict than the SFO demand 2. For example, the SFO demand 1 may be $10^4$ ppm and the SFO demand 2 may be $10^3$ ppm. In such cases, an A-IoT device 210 transmitting in a random access resource with a higher SFO demand (e.g., the less strict SFO demand such as the SFO demand 1 corresponding to $10^4$ ppm) may repeat the transmission of the sequence in the random access message 230 to match the total time duration of the msg1 transmission (e.g., to match the time duration of the time resource 2). For example, as described herein, an SFO of $10^4$ ppm may support a 31 bit length sequence while an SFO of $10^3$ ppm may support a 63 bit length sequence. Accordingly, an A-IoT device 210 that transmits a random access message in the random access resource 315-*a* with the SFO demand 1 (which is less strict than the SFO demand 2) may repeat the sequence transmission of the random access message in the random access resource 315-*a* to match the longer length of the sequences transmitted by other A-IoT devices 210 in the random access resources 315-*b* and 315-*c*.

In some examples, as shown in the random access resource diagram 305, higher SFO demands (e.g., less strict SFO demands) may be allocated prior to lower SFO demands (e.g., stricter SFO demands) in the time domain. For example, random access resources in a first time resource (time resource 1) may have an SFO demand 1 (e.g., $10^5$ ppm) and random access resources in a second, later time resource (time resource 2) may have an SFO demand 2 (e.g., $10^4$ ppm). The SFO demand 1 may be higher (e.g., less strict) than the SFO demand 2. Allocating random access resources with higher SFO demands prior in time to random access resources with lower SFO demands may minimize the initial timing offset due to SFO. For example, initial timing offset may depend on the time duration from the synchronization of the A-IoT device 210 using the downlink preamble to the uplink transmission of the random access message, and the higher SFO transmissions may be scheduled in the initial TDM slots of msg1 to minimize the initial offset.

Figure 4:
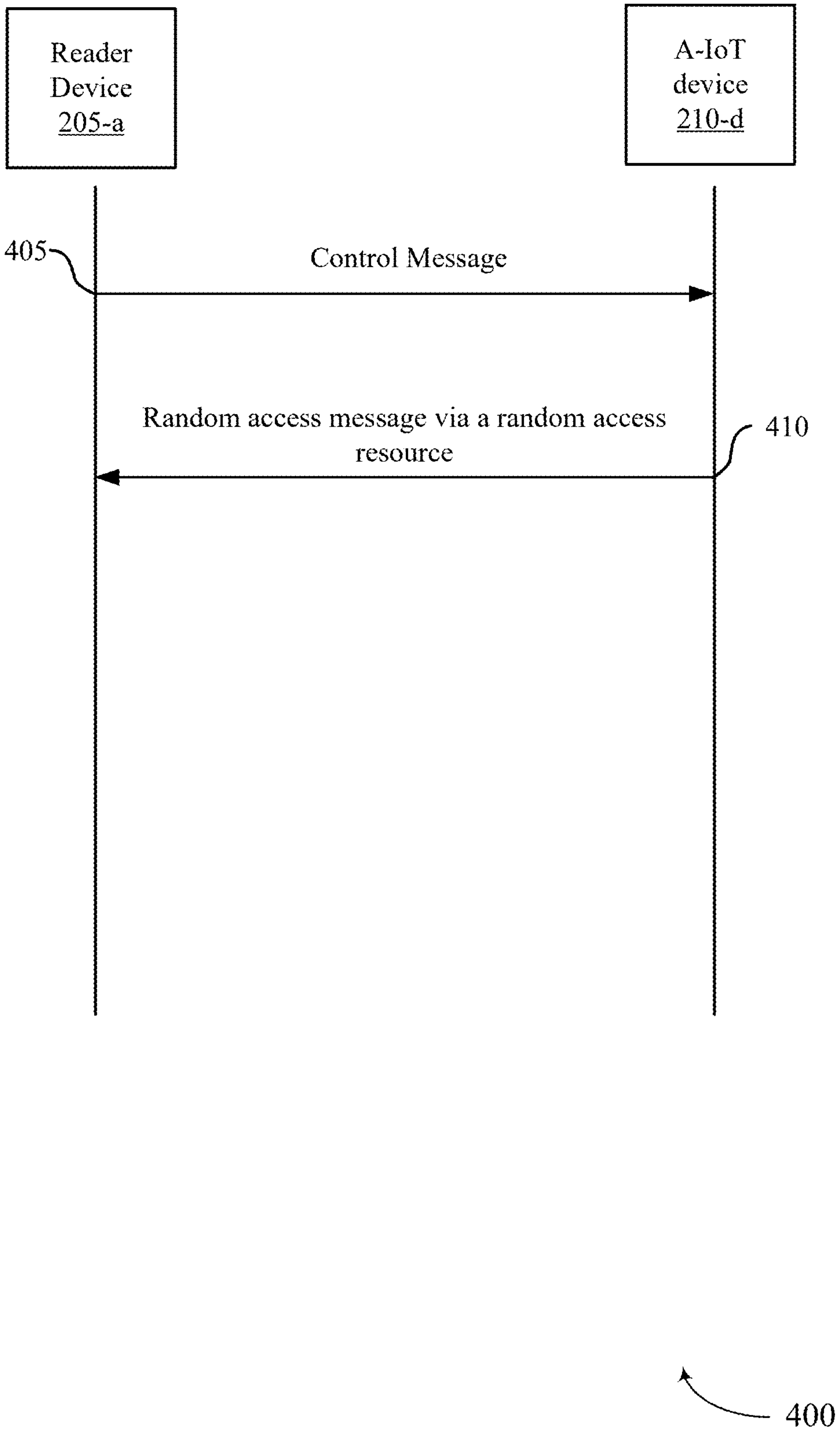
FIG. 4 shows an example of a process flow that supports random access resource selection based on SFO in accordance with one or more aspects of the present disclosure.

FIG. 4 shows an example of process flow 400 that supports random access resource selection based on SFO in accordance with one or more aspects of the present disclosure. The process flow 400 may include a reader device 205-*a*, which may be an example of a reader device 205 as described herein. The process flow 400 also may include an A-IoT device 210-*d*, which may be an example of an A-IoT device 210 as described herein. In the following description of the process flow 400, the communications between the reader device 205-*a* and the A-IoT device 210-*d* may be transmitted in a different order than the example order shown, or the operations performed by the reader device 205-*a* and the A-IoT device 210-*d* may be performed in different orders or at different times. Some operations may also be omitted from the process flow 400, and other operations may be added to the process flow 400.

At 405, the A-IoT device 210-*d* may receive, from the reader device 205-*a*, a control message that includes scheduling information for a set of multiple random access resources. The control message may indicate respective SFO demands associated with the set of multiple random access resources.

At 410, the A-IoT device 210-*d* may transmit a random access message to the reader device 205-*a* via a random access resource of the set of multiple random access resources based on the A-IoT device satisfying a first respective SFO demand associated with the random access resource. For example, the first respective SFO may be the SFO indicated by the control message as being associated with the random access resource. In some examples, the A-IoT device 210-*d* may transmit the random access message via backscatter modulation. For example, the A-IoT device 210-*d* may receive an interrogating signal from the reader device 205-*a* via the random access resource, and the A-IoT device 210-*d* may backscatter modulate the random access message based on the interrogating signal.

In some examples, the A-IoT device 210-*d* may select the subset of the set of multiple random access resources scheduled by the control message for which the A-IoT device 210-*d* satisfies the SFO demands. The random access resource may be included in the subset, and the A-IoT device 210-*d* may randomly select the random access resource from the selected subset of random access resources.

In some examples, the scheduling information may indicate that a first subset of random access channel resources of the set of multiple random access resources are scheduled in a first time resource and a second subset of random access channel resources of the set of multiple random access resources are scheduled in a second time resource. In such examples, the control message may indicate that the first subset of random access channel resources are associated with a first SFO demand that the second subset of random access channel resources are associated with a second respective SFO demand. In some examples, the first time resource is prior to the second time resource and the first respective SFO demand is less strict than the second respective SFO demand.

In some examples, at 410, the A-IoT device 210-*d* may repeat transmission of a preamble sequence in the random access resource where the scheduling information indicates that the random access resource is scheduled in a first time resource and a first frequency resource, where the scheduling information indicates that a second random access resource is scheduled in the first time resource and a second frequency resource, and where the first respective SFO demand is less strict than a second respective SFO demand offset associated with the second random access resource.

In some examples, the A-IoT device 210-*d* may receive an indication of a respective sequence length associated with the set of multiple random access resources via the control message. The A-IoT device 210-*d* may transmit the random access message using a first respective sequence length associated with the random access resource.

In some examples, the A-IoT device 210-*d* may receive an indication of a respective quantity of sequences associated with the set of multiple random access resources via the control message. The A-IoT device 210-*d* may transmit the random access message using a CDM parameter in accordance with a first respective quantity of sequences associated with the random access resource. In some examples, the first respective quantity of sequences is one based at least in part on the first respective SFO demand exceeding a threshold.

In some examples, the control message may indicate the SFO demands via indicating A-IoT device types associated with each of the set of multiple random access resources.

In some examples, the A-IoT device 210-*d* may receive, from the reader device 205-*a*, a second random access message in response to the random access message, where the second random access message indicates a resource for transmission of an identifier of the A-IoT device 210-*d*. The A-IoT device 210-*d* may transmit, to the reader device 205-*a*, a third random access message via the resource, and the third random access message may indicate the identifier of the A-IoT device 210-*d*.

Figure 5:
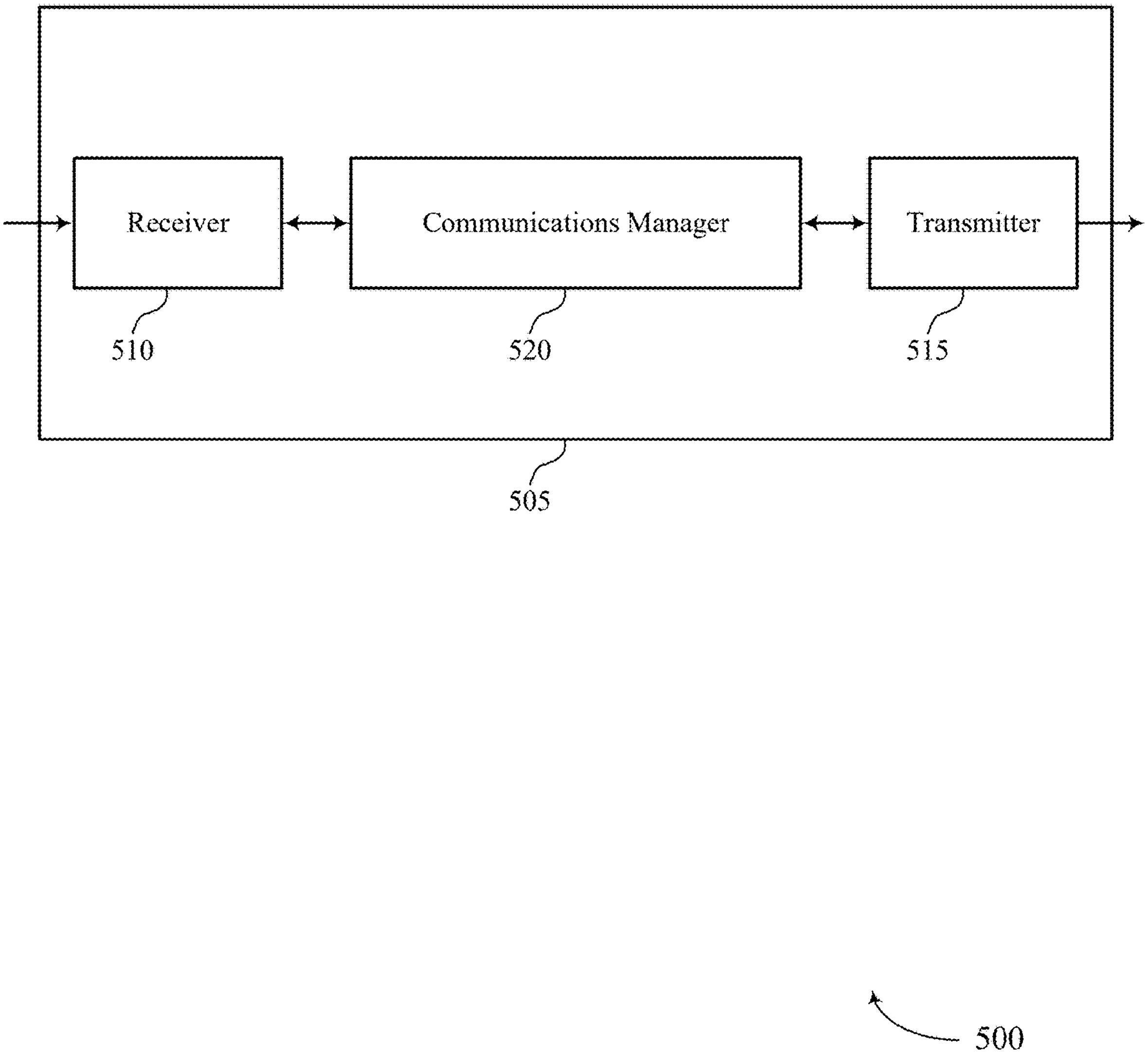
FIGS. 5 and 6 show block diagrams of devices that support random access resource selection based on SFO in accordance with one or more aspects of the present disclosure.

FIG. 5 shows a block diagram 500 of a device 505 that supports random access resource selection based on SFO in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to random access resource selection based on SFO). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to random access resource selection based on SFO). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations or components thereof may be examples of means for performing various aspects of random access resource selection based on SFO as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor (e.g., referred to as a processor-executable code). If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for receiving a control message that includes scheduling information for a set of multiple random access resources, where the control message indicates respective SFO demands associated with the set of multiple random access resources. The communications manager 520 is capable of, configured to, or operable to support a means for transmitting a random access message via a random access resource of the set of multiple random access resources based on the A-IoT device satisfying a first respective SFO demand associated with the random access resource.

Additionally, or alternatively, the communications manager 520 may support wireless communications in accordance with examples as disclosed herein. For example, the communications manager 520 is capable of, configured to, or operable to support a means for transmitting a control message that includes scheduling information for a set of multiple random access resources, where the control message indicates respective SFO demands associated with the set of multiple random access resources. The communications manager 520 is capable of, configured to, or operable to support a means for receiving, from an A-IoT device, a random access message via a random access resource of the set of multiple random access resources based on the A-IoT device satisfying a first respective SFO demand associated with the random access resource.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for more efficient utilization of communication resources.

Figure 6:
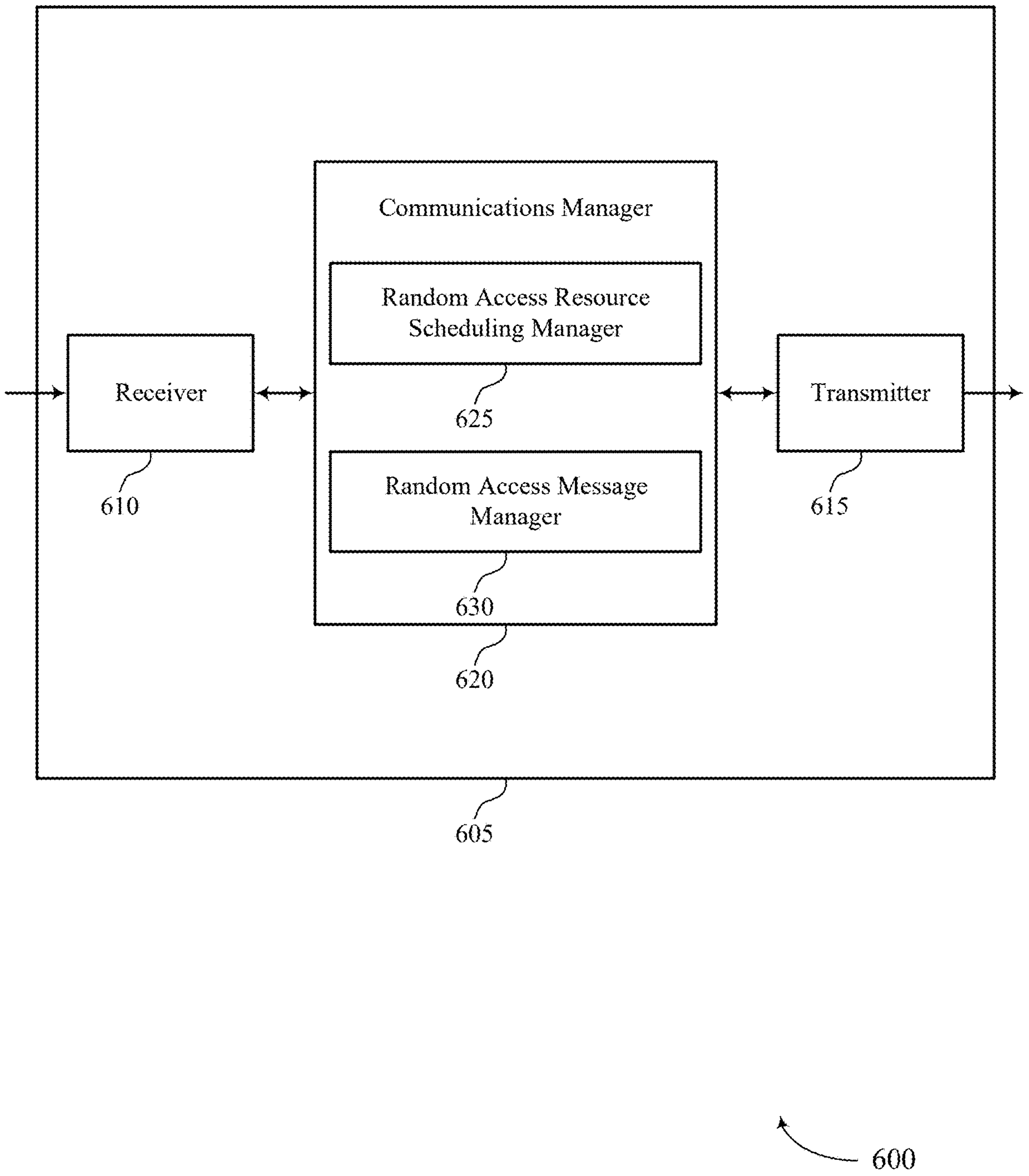

FIG. 6 shows a block diagram 600 of a device 605 that supports random access resource selection based on SFO in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to random access resource selection based on SFO). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to random access resource selection based on SFO). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of random access resource selection based on SFO as described herein. For example, the communications manager 620 may include a random access resource scheduling manager 625, a random access message manager 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The random access resource scheduling manager 625 is capable of, configured to, or operable to support a means for receiving a control message that includes scheduling information for a set of multiple random access resources, where the control message indicates respective SFO demands associated with the set of multiple random access resources. The random access message manager 630 is capable of, configured to, or operable to support a means for transmitting a random access message via a random access resource of the set of multiple random access resources based on the A-IoT device satisfying a first respective SFO demand associated with the random access resource.

Additionally, or alternatively, the communications manager 620 may support wireless communications in accordance with examples as disclosed herein. The random access resource scheduling manager 625 is capable of, configured to, or operable to support a means for transmitting a control message that includes scheduling information for a set of multiple random access resources, where the control message indicates respective SFO demands associated with the set of multiple random access resources. The random access message manager 630 is capable of, configured to, or operable to support a means for receiving, from an A-IoT device, a random access message via a random access resource of the set of multiple random access resources based on the A-IoT device satisfying a first respective SFO demand associated with the random access resource.

Figure 7:
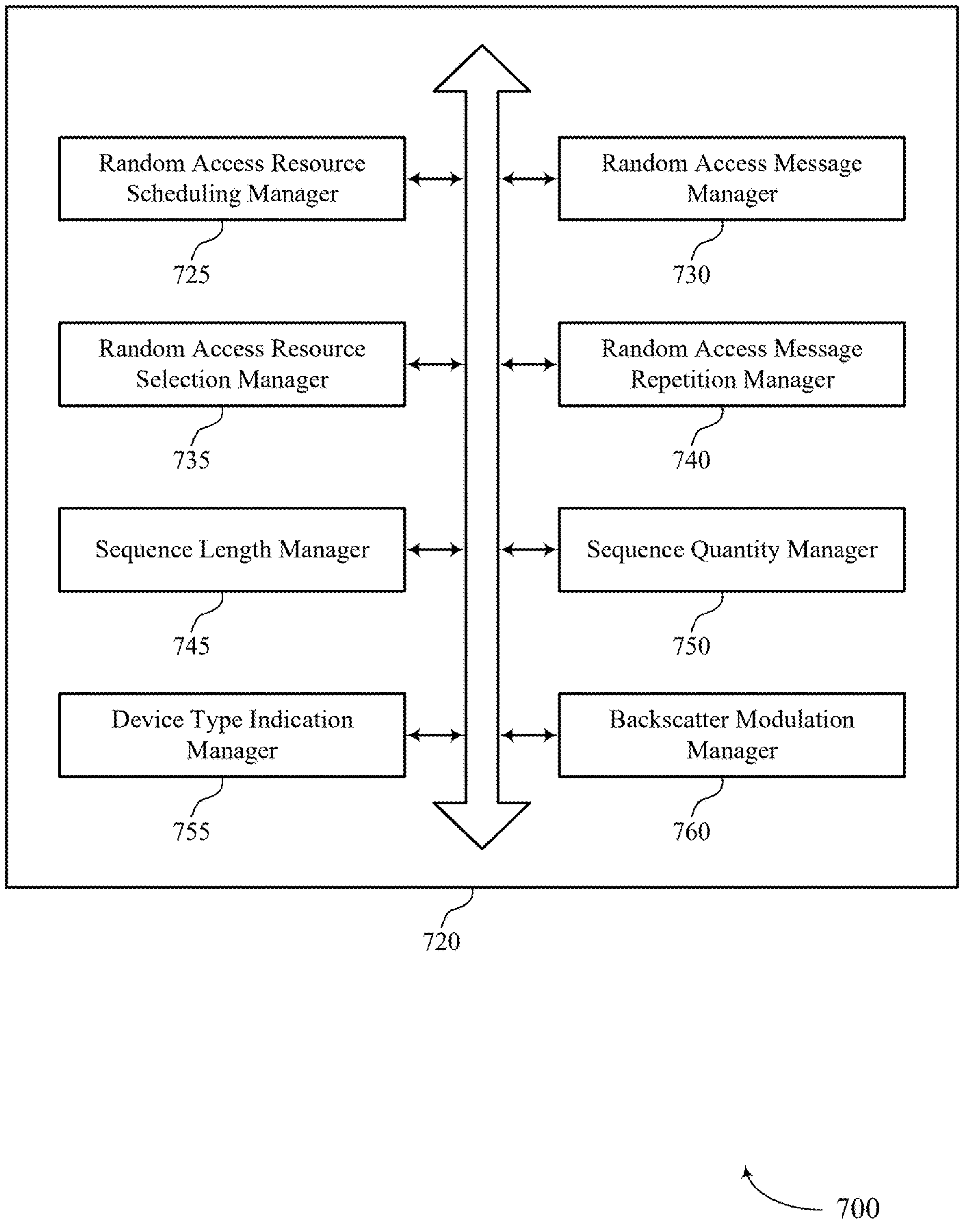
FIG. 7 shows a block diagram of a communications manager that supports random access resource selection based on SFO in accordance with one or more aspects of the present disclosure.

FIG. 7 shows a block diagram 700 of a communications manager 720 that supports random access resource selection based on SFO in accordance with one or more aspects of the present disclosure. The communications manager 720 may be an example of aspects of a communications manager 520, a communications manager 620, or both, as described herein. The communications manager 720, or various components thereof, may be an example of means for performing various aspects of random access resource selection based on SFO as described herein. For example, the communications manager 720 may include a random access resource scheduling manager 725, a random access message manager 730, a random access resource selection manager 735, a random access message repetition manager 740, a sequence length manager 745, a sequence quantity manager 750, a device type indication manager 755, a backscatter modulation manager 760, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The random access resource scheduling manager 725 is capable of, configured to, or operable to support a means for receiving a control message that includes scheduling information for a set of multiple random access resources, where the control message indicates respective SFO demands associated with the set of multiple random access resources. The random access message manager 730 is capable of, configured to, or operable to support a means for transmitting a random access message via a random access resource of the set of multiple random access resources based on the A-IoT device satisfying a first respective SFO demand associated with the random access resource.

In some examples, the random access resource selection manager 735 is capable of, configured to, or operable to support a means for selecting a subset of random access resources from the set of multiple random access resources based on the A-IoT device satisfying the first respective SFO demand associated with each of the subset of random access resources. In some examples, the random access resource selection manager 735 is capable of, configured to, or operable to support a means for randomly selecting the random access resource from the subset of random access resources.

In some examples, to support receiving the control message, the random access resource scheduling manager 725 is capable of, configured to, or operable to support a means for receiving the control message that includes the scheduling information that indicates a first subset of random access channel resources of the set of multiple random access resources are scheduled in a first time resource and a second subset of random access channel resources of the set of multiple random access resources are scheduled in a second time resource, where the control message indicates that the first subset of random access channel resources are associated with a first SFO demand, and where the control message indicates that the second subset of random access channel resources are associated with a second respective SFO demand.

In some examples, the first time resource is prior to the second time resource. In some examples, the first respective SFO demand is less strict than the second respective SFO demand.

In some examples, to support transmitting the random access message, the random access message repetition manager 740 is capable of, configured to, or operable to support a means for repeating transmission of a preamble sequence in the random access resource, where the scheduling information indicates that the random access resource is scheduled in a first time resource and a first frequency resource, where the scheduling information indicates that a second random access resource is scheduled in the first time resource and a second frequency resource, and where the first respective SFO demand is less strict than a second respective SFO demand offset associated with the second random access resource.

In some examples, to support receiving the control message, the sequence length manager 745 is capable of, configured to, or operable to support a means for receiving an indication of a respective sequence length associated with the set of multiple random access resources, where transmitting the random access message includes transmitting the random access message using a first respective sequence length associated with the random access resource.

In some examples, to support receiving the control message, the sequence quantity manager 750 is capable of, configured to, or operable to support a means for receiving an indication of a respective quantity of sequences associated with the set of multiple random access resources, where transmitting the random access message includes transmitting the random access message using a CDM parameter in accordance with a first respective quantity of sequences associated with the random access resource.

In some examples, the first respective quantity of sequences is one based on the first respective SFO demand exceeding a threshold.

In some examples, to support receiving the control message, the device type indication manager 755 is capable of, configured to, or operable to support a means for receiving the control message that indicates respective device types associated with the set of multiple random access resources, where the control message indicates the respective SFO demands via indication of the respective device types.

In some examples, the backscatter modulation manager 760 is capable of, configured to, or operable to support a means for receiving an interrogating signal via the random access resource, where transmission of the random access message is via backscatter modulation of the interrogating signal.

In some examples, the random access message manager 730 is capable of, configured to, or operable to support a means for receiving a second random access message in response to the random access message, where the second random access message indicates a resource for transmission of an identifier of the A-IoT device. In some examples, the random access message manager 730 is capable of, configured to, or operable to support a means for transmitting a third random access message via the resource, where the third random access message indicates the identifier of the A-IoT device.

Additionally, or alternatively, the communications manager 720 may support wireless communications in accordance with examples as disclosed herein. In some examples, the random access resource scheduling manager 725 is capable of, configured to, or operable to support a means for transmitting a control message that includes scheduling information for a set of multiple random access resources, where the control message indicates respective SFO demands associated with the set of multiple random access resources. In some examples, the random access message manager 730 is capable of, configured to, or operable to support a means for receiving, from an A-IoT device, a random access message via a random access resource of the set of multiple random access resources based on the A-IoT device satisfying a first respective SFO demand associated with the random access resource.

In some examples, to support transmitting a control message, the random access resource scheduling manager 725 is capable of, configured to, or operable to support a means for transmitting the control message that includes the scheduling information that indicates a first subset of random access channel resources of the set of multiple random access resources are scheduled in a first time resource and a second subset of random access channel resources of the set of multiple random access resources are scheduled in a second time resource, where the control message indicates that the first subset of random access channel resources are associated with a first SFO demand, and where the control message indicates that the second subset of random access channel resources are associated with a second respective SFO demand.

In some examples, the first time resource is prior to the second time resource. In some examples, the first respective SFO demand is less strict than the second respective SFO demand.

In some examples, to support receiving the random access message, the random access message repetition manager 740 is capable of, configured to, or operable to support a means for receiving repeated transmissions of a preamble sequence in the random access resource, where the scheduling information indicates that the random access resource is scheduled in a first time resource and a first frequency resource, where the scheduling information indicates that a second random access resource is scheduled in the first time resource and a second frequency resource, and where the first respective SFO demand is less strict than a second respective SFO demand offset associated with the second random access resource.

In some examples, to support transmitting a control message, the sequence length manager 745 is capable of, configured to, or operable to support a means for transmitting an indication of a respective sequence length associated with the set of multiple random access resources, where transmitting the random access message includes transmitting the random access message using a first respective sequence length associated with the random access resource.

In some examples, to support transmitting a control message, the sequence quantity manager 750 is capable of, configured to, or operable to support a means for transmitting an indication of a respective quantity of sequences associated with the set of multiple random access resources, where transmitting the random access message includes transmitting the random access message using a code division multiplexing parameter in accordance with a first respective quantity of sequences associated with the random access resource.

In some examples, the first respective quantity of sequences is one based on the first respective SFO demand exceeding a threshold.

In some examples, to support transmitting a control message, the device type indication manager 755 is capable of, configured to, or operable to support a means for transmitting the control message that indicates respective device types associated with the set of multiple random access resources, where the control message indicates the respective SFO demands via indication of the respective device types.

In some examples, the backscatter modulation manager 760 is capable of, configured to, or operable to support a means for transmitting an interrogating signal via the random access resource, where reception of the random access message is via backscatter modulation of the interrogating signal.

In some examples, the random access message manager 730 is capable of, configured to, or operable to support a means for transmitting a second random access message in response to the random access message, where the second random access message indicates a resource for transmission of an identifier of the A-IoT device. In some examples, the random access message manager 730 is capable of, configured to, or operable to support a means for receiving, from the A-IoT device, a third random access message via the resource, where the third random access message indicates the identifier of the A-IoT device.

Figure 8:
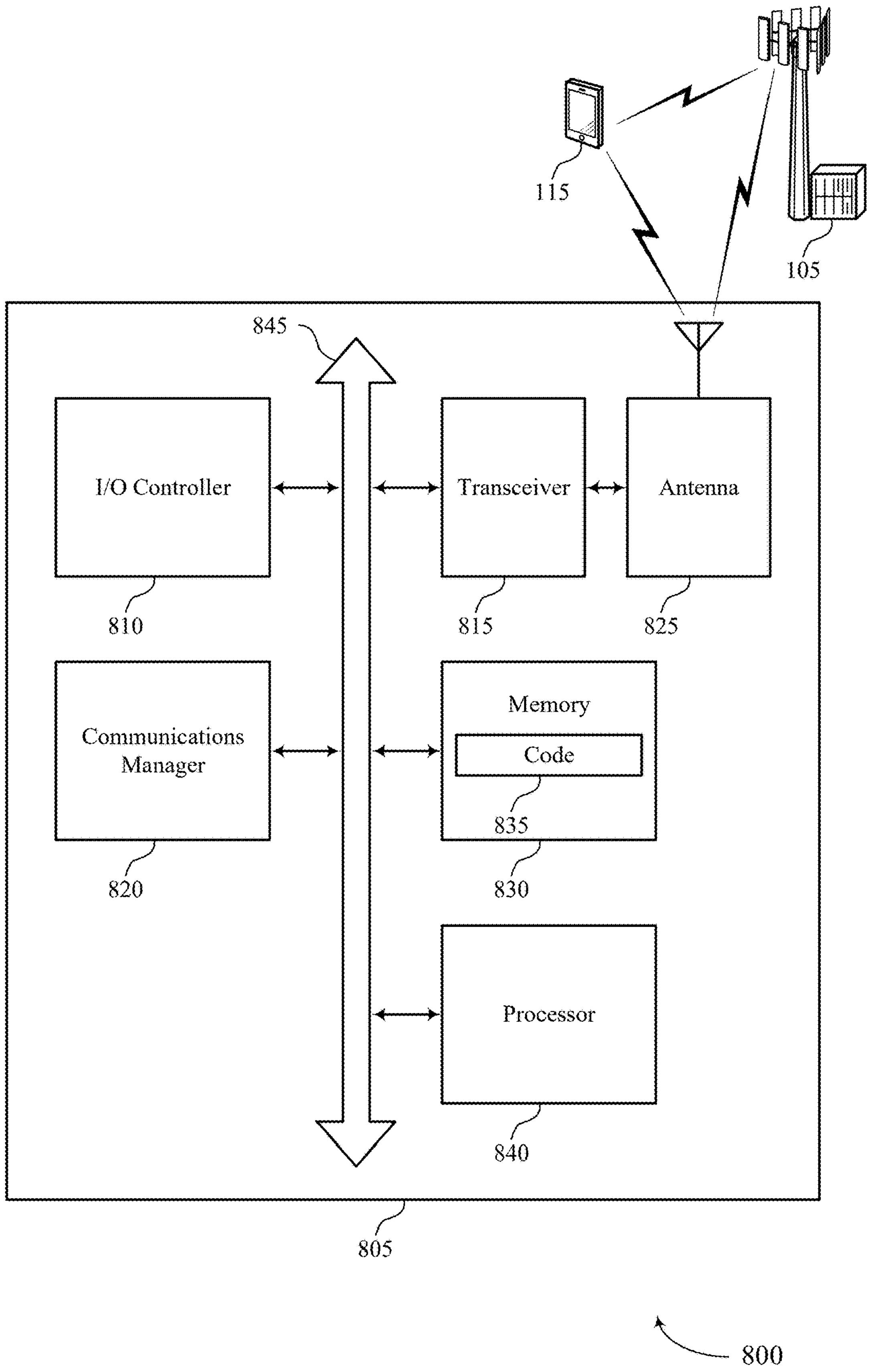
FIG. 8 shows a diagram of a system including a device that supports random access resource selection based on SFO in accordance with one or more aspects of the present disclosure.

FIG. 8 shows a diagram of a system 800 including a device 805 that supports random access resource selection based on SFO in accordance with one or more aspects of the present disclosure. The device 805 may be an example of or include components of a device 505, a device 605, or a UE 115 as described herein. The device 805 may communicate (e.g., wirelessly) with one or more other devices (e.g., network entities 105, UEs 115, or a combination thereof). The device 805 may include components for bi-directional voice and data communications including components for transmitting and receiving communications, such as a communications manager 820, an input/output (I/O) controller, such as an I/O controller 810, a transceiver 815, one or more antennas 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna. However, in some other cases, the device 805 may have more than one antenna, which may be capable of concurrently transmitting or receiving multiple wireless transmissions. The transceiver 815 may communicate bi-directionally via the one or more antennas 825 using wired or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable, or processor-executable code, such as the code 835. The code 835 may include instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may include, among other things, a basic I/O system (BIOS) which may control basic hardware or software operation such as the interaction with peripheral components or devices.

The at least one processor 840 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting random access resource selection based on SFO). For example, the device 805 or a component of the device 805 may include at least one processor 840 and at least one memory 830 coupled with or to the at least one processor 840, the at least one processor 840 and the at least one memory 830 configured to perform various functions described herein.

In some examples, the at least one processor 840 may include multiple processors and the at least one memory 830 may include multiple memories. One or more of the multiple processors may be coupled with one or more of the multiple memories, which may, individually or collectively, be configured to perform various functions described herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. For example, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code 835 (e.g., processor-executable code) stored in the at least one memory 830 or otherwise, to perform one or more of the functions described herein.

The communications manager 820 may support wireless communications in accordance with examples as disclosed herein. For example, the communications manager 820 is capable of, configured to, or operable to support a means for receiving a control message that includes scheduling information for a set of multiple random access resources, where the control message indicates respective SFO demands associated with the set of multiple random access resources. The communications manager 820 is capable of, configured to, or operable to support a means for transmitting a random access message via a random access resource of the set of multiple random access resources based on the A-IoT device satisfying a first respective SFO demand associated with the random access resource.

Additionally, or alternatively, the communications manager 820 may support wireless communications in accordance with examples as disclosed herein. For example, the communications manager 820 is capable of, configured to, or operable to support a means for transmitting a control message that includes scheduling information for a set of multiple random access resources, where the control message indicates respective SFO demands associated with the set of multiple random access resources. The communications manager 820 is capable of, configured to, or operable to support a means for receiving, from an A-IoT device, a random access message via a random access resource of the set of multiple random access resources based on the A-IoT device satisfying a first respective SFO demand associated with the random access resource.

By including or configuring the communications manager 820 in accordance with examples as described herein, the device 805 may support techniques for improved communication reliability, reduced latency, more efficient utilization of communication resources, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of random access resource selection based on SFO as described herein, or the at least one processor 840 and the at least one memory 830 may be otherwise configured to, individually or collectively, perform or support such operations.

Figure 9:
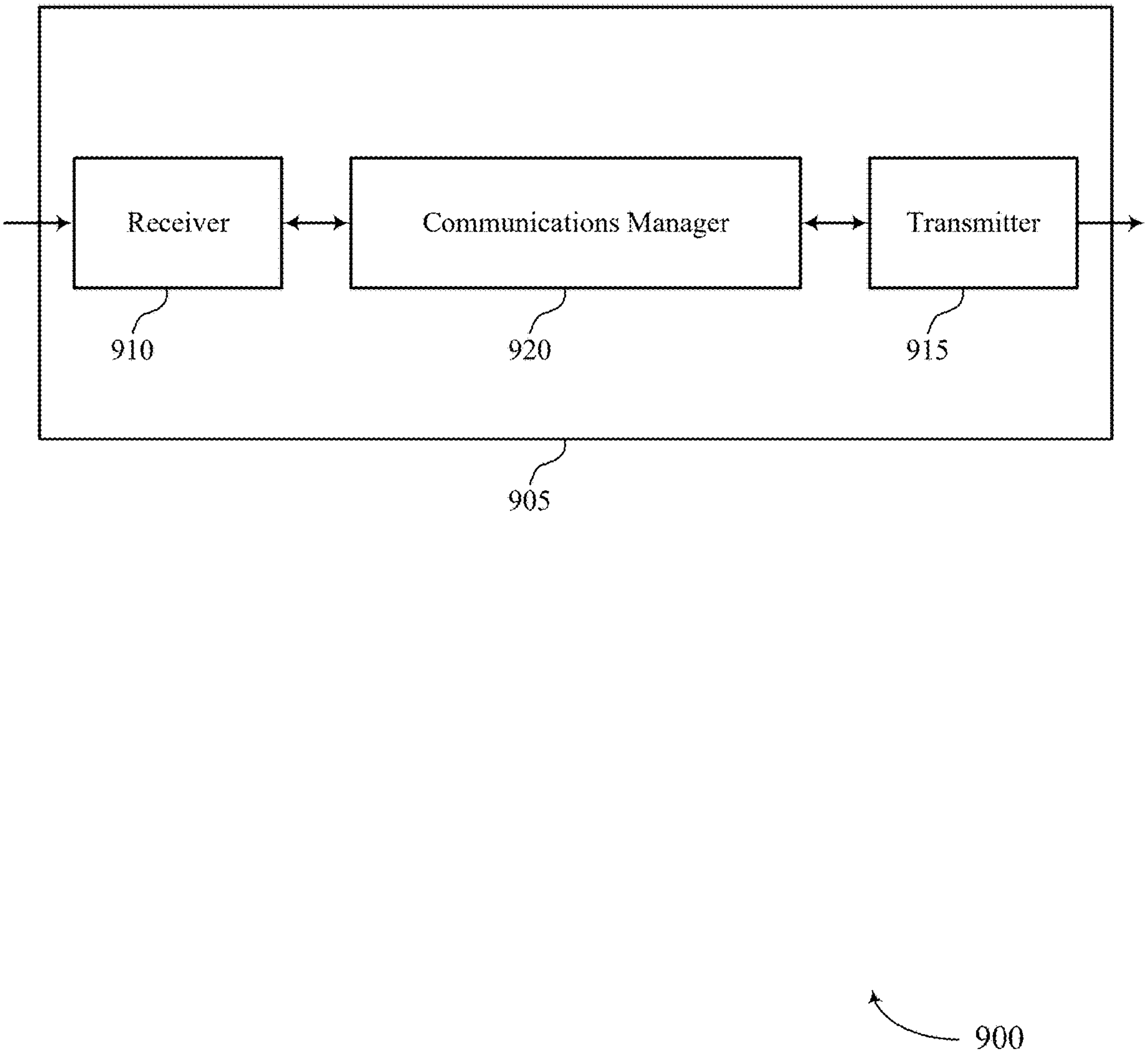
FIGS. 9 and 10 show block diagrams of devices that support random access resource selection based on SFO in accordance with one or more aspects of the present disclosure.

FIG. 9 shows a block diagram 900 of a device 905 that supports random access occasion selection based on SFO in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations or components thereof may be examples of means for performing various aspects of random access occasion selection based on SFO as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor (e.g., referred to as a processor-executable code). If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for transmitting a control message that includes scheduling information for a set of multiple random access resources, where the control message indicates respective SFO demands associated with the set of multiple random access resources. The communications manager 920 is capable of, configured to, or operable to support a means for receiving, from an A-IoT device, a random access message via a random access resource of the set of multiple random access resources based on the A-IoT device satisfying a first respective SFO demand associated with the random access resource.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for more efficient utilization of communication resources.

Figure 10:
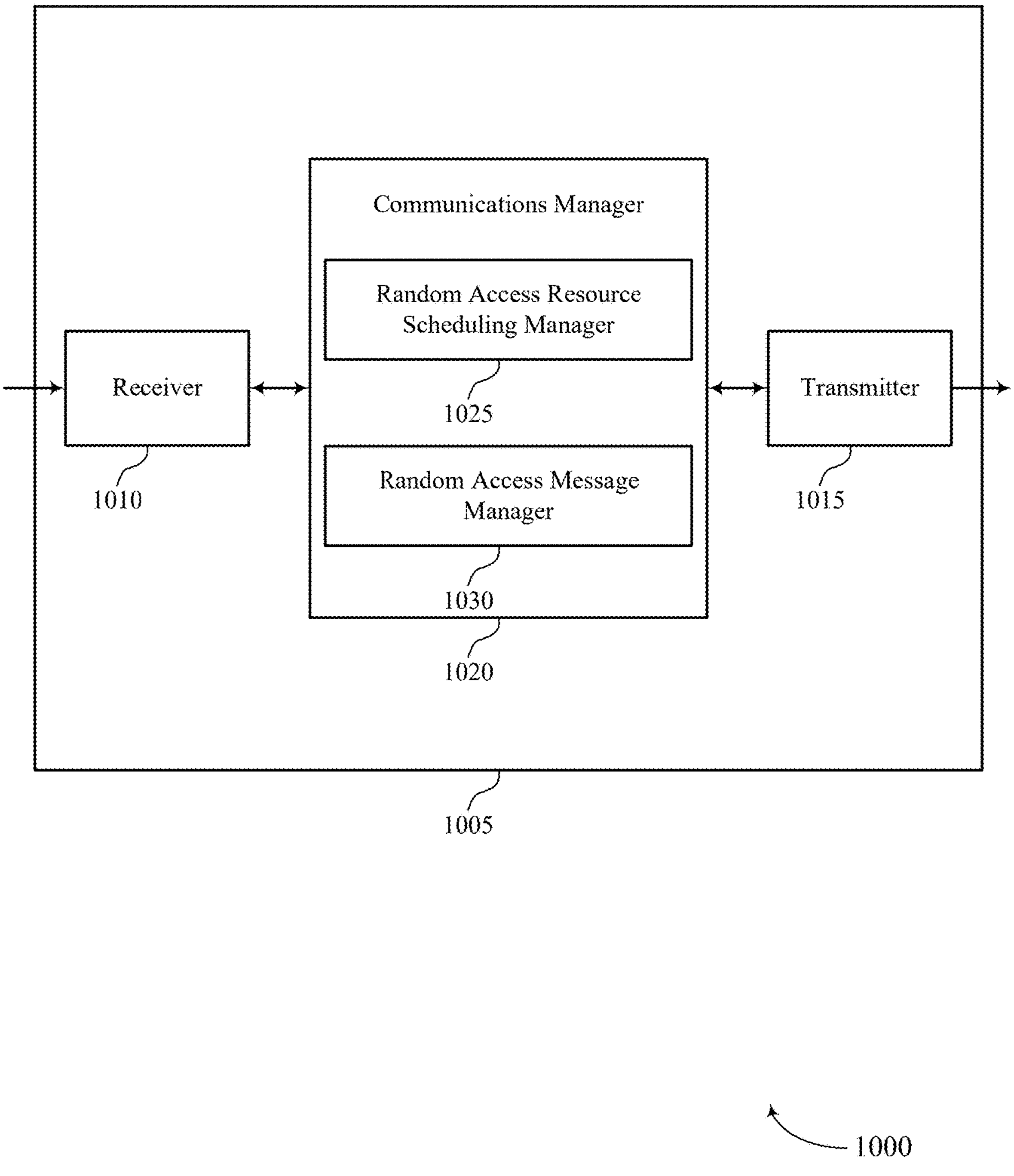

FIG. 10 shows a block diagram 1000 of a device 1005 that supports random access occasion selection based on SFO in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one of more components of the device 1005 (e.g., the receiver 1010, the transmitter 1015, the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of random access occasion selection based on SFO as described herein. For example, the communications manager 1020 may include a Random Access Resource Scheduling Manager 1025 a Random Access Message Manager 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The Random Access Resource Scheduling Manager 1025 is capable of, configured to, or operable to support a means for transmitting a control message that includes scheduling information for a set of multiple random access resources, where the control message indicates respective SFO demands associated with the set of multiple random access resources. The Random Access Message Manager 1030 is capable of, configured to, or operable to support a means for receiving, from an A-IoT device, a random access message via a random access resource of the set of multiple random access resources based on the A-IoT device satisfying a first respective SFO demand associated with the random access resource.

Figure 11:
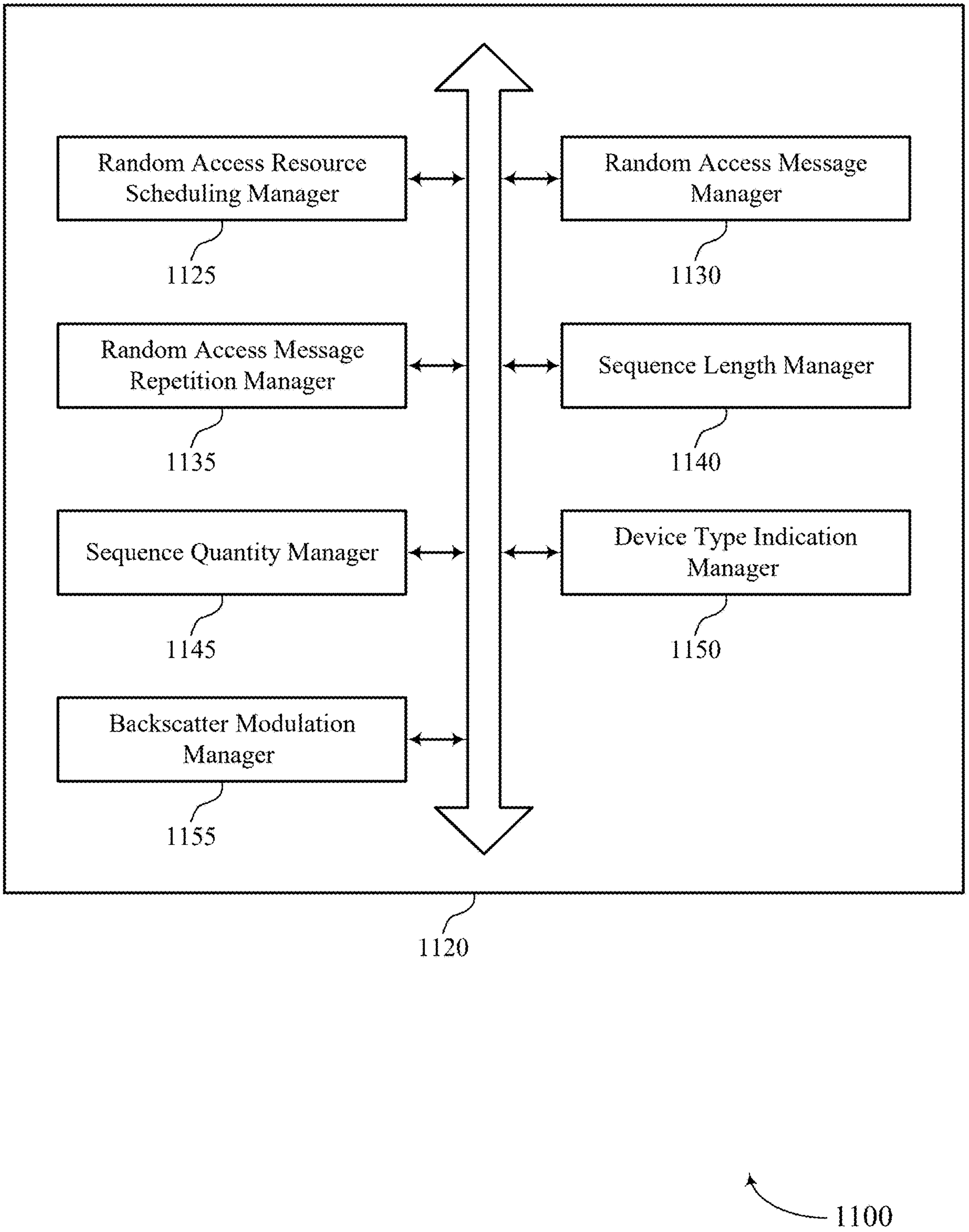
FIG. 11 shows a block diagram of a communications manager that supports random access resource selection based on SFO in accordance with one or more aspects of the present disclosure.

FIG. 11 shows a block diagram 1100 of a communications manager 1120 that supports random access occasion selection based on SFO in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of random access occasion selection based on SFO as described herein. For example, the communications manager 1120 may include a Random Access Resource Scheduling Manager 1125, a Random Access Message Manager 1130, a random access message repetition manager 1135, a sequence length manager 1140, a sequence quantity manager 1145, a device type indication manager 1150, a backscatter modulation manager 1155, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The Random Access Resource Scheduling Manager 1125 is capable of, configured to, or operable to support a means for transmitting a control message that includes scheduling information for a set of multiple random access resources, where the control message indicates respective SFO demands associated with the set of multiple random access resources. The Random Access Message Manager 1130 is capable of, configured to, or operable to support a means for receiving, from an A-IoT device, a random access message via a random access resource of the set of multiple random access resources based on the A-IoT device satisfying a first respective SFO demand associated with the random access resource.

In some examples, to support transmitting a control message, the Random Access Resource Scheduling Manager 1125 is capable of, configured to, or operable to support a means for transmitting the control message that includes the scheduling information that indicates a first subset of random access channel resources of the set of multiple random access resources are scheduled in a first time resource and a second subset of random access channel resources of the set of multiple random access resources are scheduled in a second time resource, where the control message indicates that the first subset of random access channel resources are associated with a first SFO demand, and where the control message indicates that the second subset of random access channel resources are associated with a second respective SFO demand.

In some examples, the first time resource is prior to the second time resource. In some examples, the first respective SFO demand is less strict than the second respective SFO demand.

In some examples, to support receiving the random access message, the random access message repetition manager 1135 is capable of, configured to, or operable to support a means for receiving repeated transmissions of a preamble sequence in the random access resource, where the scheduling information indicates that the random access resource is scheduled in a first time resource and a first frequency resource, where the scheduling information indicates that a second random access resource is scheduled in the first time resource and a second frequency resource, and where the first respective SFO demand is less strict than a second respective SFO demand offset associated with the second random access resource.

In some examples, to support transmitting a control message, the sequence length manager 1140 is capable of, configured to, or operable to support a means for transmitting an indication of a respective sequence length associated with the set of multiple random access resources, where transmitting the random access message includes transmitting the random access message using a first respective sequence length associated with the random access resource.

In some examples, to support transmitting a control message, the sequence quantity manager 1145 is capable of, configured to, or operable to support a means for transmitting an indication of a respective quantity of sequences associated with the set of multiple random access resources, where transmitting the random access message includes transmitting the random access message using a code division multiplexing parameter in accordance with a first respective quantity of sequences associated with the random access resource.

In some examples, the first respective quantity of sequences is one based on the first respective SFO demand exceeding a threshold.

In some examples, to support transmitting a control message, the device type indication manager 1150 is capable of, configured to, or operable to support a means for transmitting the control message that indicates respective device types associated with the set of multiple random access resources, where the control message indicates the respective SFO demands via indication of the respective device types.

In some examples, the backscatter modulation manager 1155 is capable of, configured to, or operable to support a means for transmitting an interrogating signal via the random access resource, where reception of the random access message is via backscatter modulation of the interrogating signal.

In some examples, the Random Access Message Manager 1130 is capable of, configured to, or operable to support a means for transmitting a second random access message in response to the random access message, where the second random access message indicates a resource for transmission of an identifier of the A-IoT device. In some examples, the Random Access Message Manager 1130 is capable of, configured to, or operable to support a means for receiving, from the A-IoT device, a third random access message via the resource, where the third random access message indicates the identifier of the A-IoT device.

Figure 12:
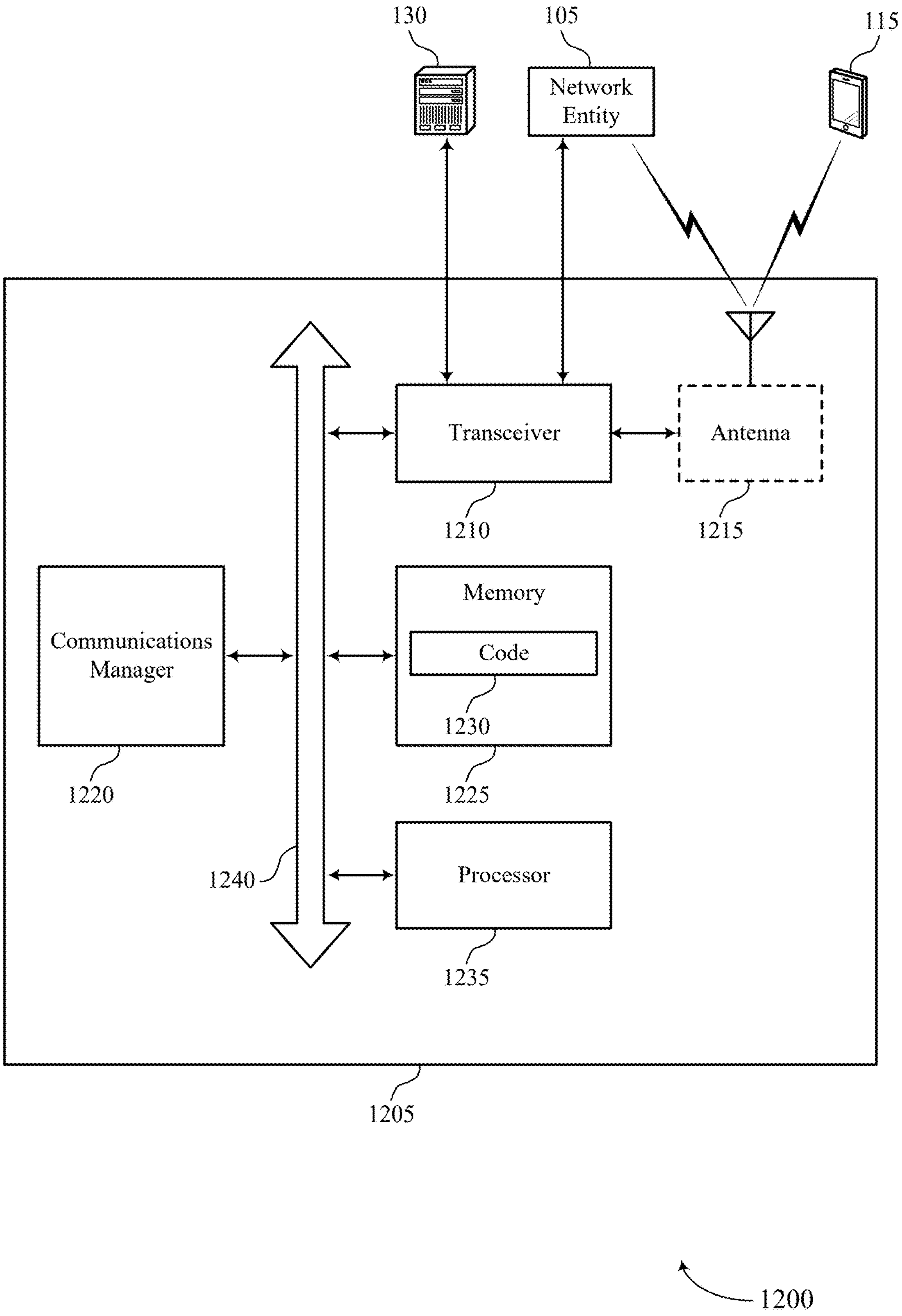
FIG. 12 shows a diagram of a system including a device that supports random access resource selection based on SFO in accordance with one or more aspects of the present disclosure.

FIG. 12 shows a diagram of a system 1200 including a device 1205 that supports random access occasion selection based on SFO in accordance with one or more aspects of the present disclosure. The device 1205 may be an example of or include components of a device 905, a device 1005, or a network entity 105 as described herein. The device 1205 may communicate with other network devices or network equipment such as one or more of the network entities 105, UEs 115, or any combination thereof. The communications may include communications over one or more wired interfaces, over one or more wireless interfaces, or any combination thereof. The device 1205 may include components that support outputting and obtaining communications, such as a communications manager 1220, a transceiver 1210, one or more antennas 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., communication link(s) 125, backhaul communication link(s) 120, a midhaul communication link 162, a fronthaul communication link 168).

The at least one memory 1225 may include RAM, ROM, or any combination thereof. The at least one memory 1225 may store computer-readable, computer-executable, or processor-executable code, such as the code 1230. The code 1230 may include instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may include, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting random access occasion selection based on SFO). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225).

In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. For example, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with one or more other network entities 105, and may include a controller or scheduler for controlling communications with UEs 115 (e.g., in cooperation with the one or more other network devices). In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for transmitting a control message that includes scheduling information for a set of multiple random access resources, where the control message indicates respective SFO demands associated with the set of multiple random access resources. The communications manager 1220 is capable of, configured to, or operable to support a means for receiving, from an A-IoT device, a random access message via a random access resource of the set of multiple random access resources based on the A-IoT device satisfying a first respective SFO demand associated with the random access resource.

By including or configuring the communications manager 1220 in accordance with examples as described herein, the device 1205 may support techniques for improved communication reliability, reduced latency, more efficient utilization of communication resources, and improved coordination between devices.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of random access occasion selection based on SFO as described herein, or the at least one processor 1235 and the at least one memory 1225 may be otherwise configured to, individually or collectively, perform or support such operations.

Figure 13:
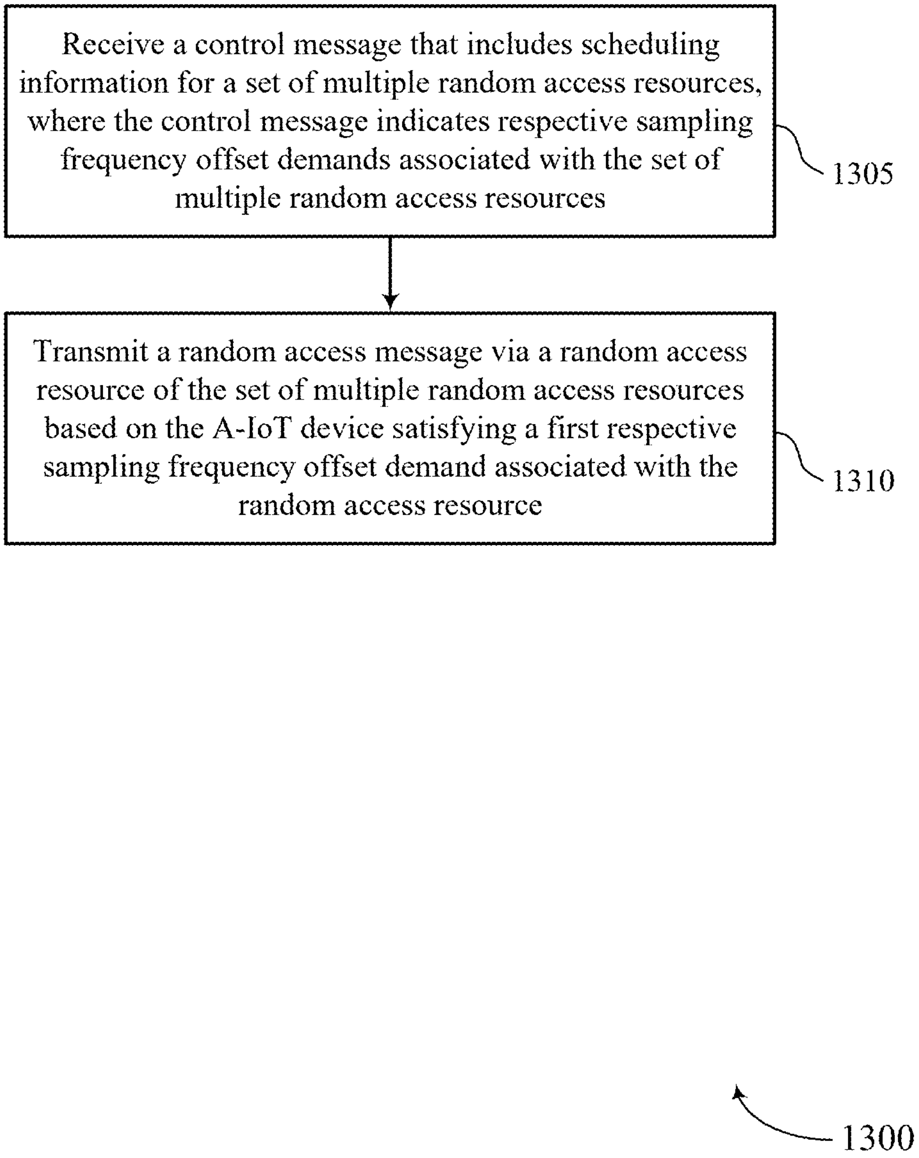
FIGS. 13 through 16 show flowcharts illustrating methods that support random access resource selection based on SFO in accordance with one or more aspects of the present disclosure.

FIG. 13 shows a flowchart illustrating a method 1300 that supports random access resource selection based on SFO in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving a control message that includes scheduling information for a set of multiple random access resources, where the control message indicates respective SFO demands associated with the set of multiple random access resources. The operations of 1305 may be performed in accordance with examples as disclosed herein. In some examples, aspects of the operations of 1305 may be performed by a random access resource scheduling manager 725 as described with reference to FIG. 7.

At 1310, the method may include transmitting a random access message via a random access resource of the set of multiple random access resources based on the A-IoT device satisfying a first respective SFO demand associated with the random access resource. The operations of 1310 may be performed in accordance with examples as disclosed herein. In some examples, aspects of the operations of 1310 may be performed by a random access message manager 730 as described with reference to FIG. 7.

Figure 14:
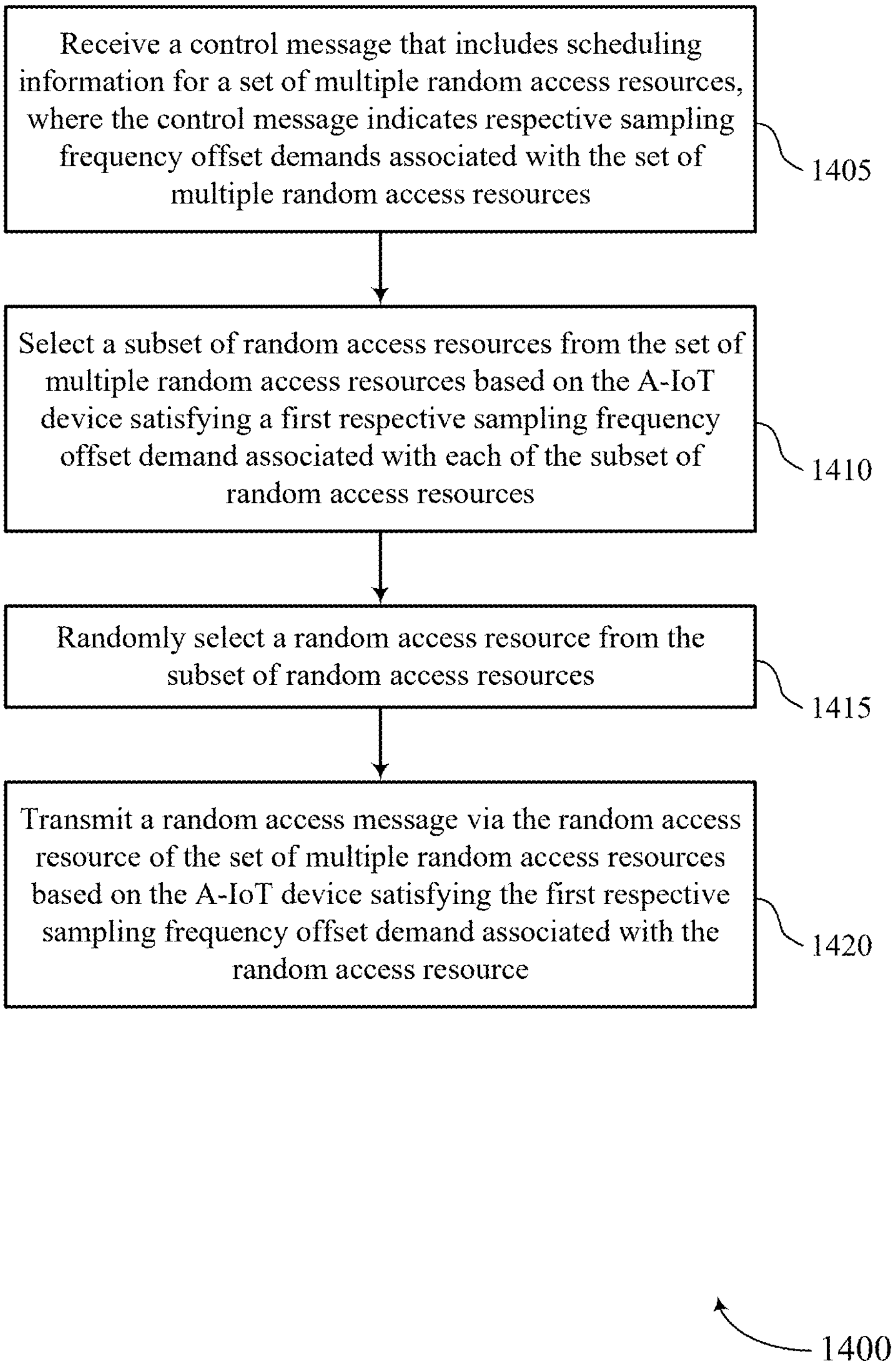

FIG. 14 shows a flowchart illustrating a method 1400 that supports random access resource selection based on SFO in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving a control message that includes scheduling information for a set of multiple random access resources, where the control message indicates respective SFO demands associated with the set of multiple random access resources. The operations of 1405 may be performed in accordance with examples as disclosed herein. In some examples, aspects of the operations of 1405 may be performed by a random access resource scheduling manager 725 as described with reference to FIG. 7.

At 1410, the method may include selecting a subset of random access resources from the set of multiple random access resources based on the A-IoT device satisfying a first respective SFO demand associated with each of the subset of random access resources. The operations of 1410 may be performed in accordance with examples as disclosed herein. In some examples, aspects of the operations of 1410 may be performed by a random access resource selection manager 735 as described with reference to FIG. 7.

At 1415, the method may include randomly selecting a random access resource from the subset of random access resources. The operations of 1415 may be performed in accordance with examples as disclosed herein. In some examples, aspects of the operations of 1415 may be performed by a random access resource selection manager 735 as described with reference to FIG. 7.

At 1420, the method may include transmitting a random access message via the random access resource of the set of multiple random access resources based on the A-IoT device satisfying the first respective SFO demand associated with the random access resource. The operations of 1420 may be performed in accordance with examples as disclosed herein. In some examples, aspects of the operations of 1420 may be performed by a random access message manager 730 as described with reference to FIG. 7.

Figure 15:
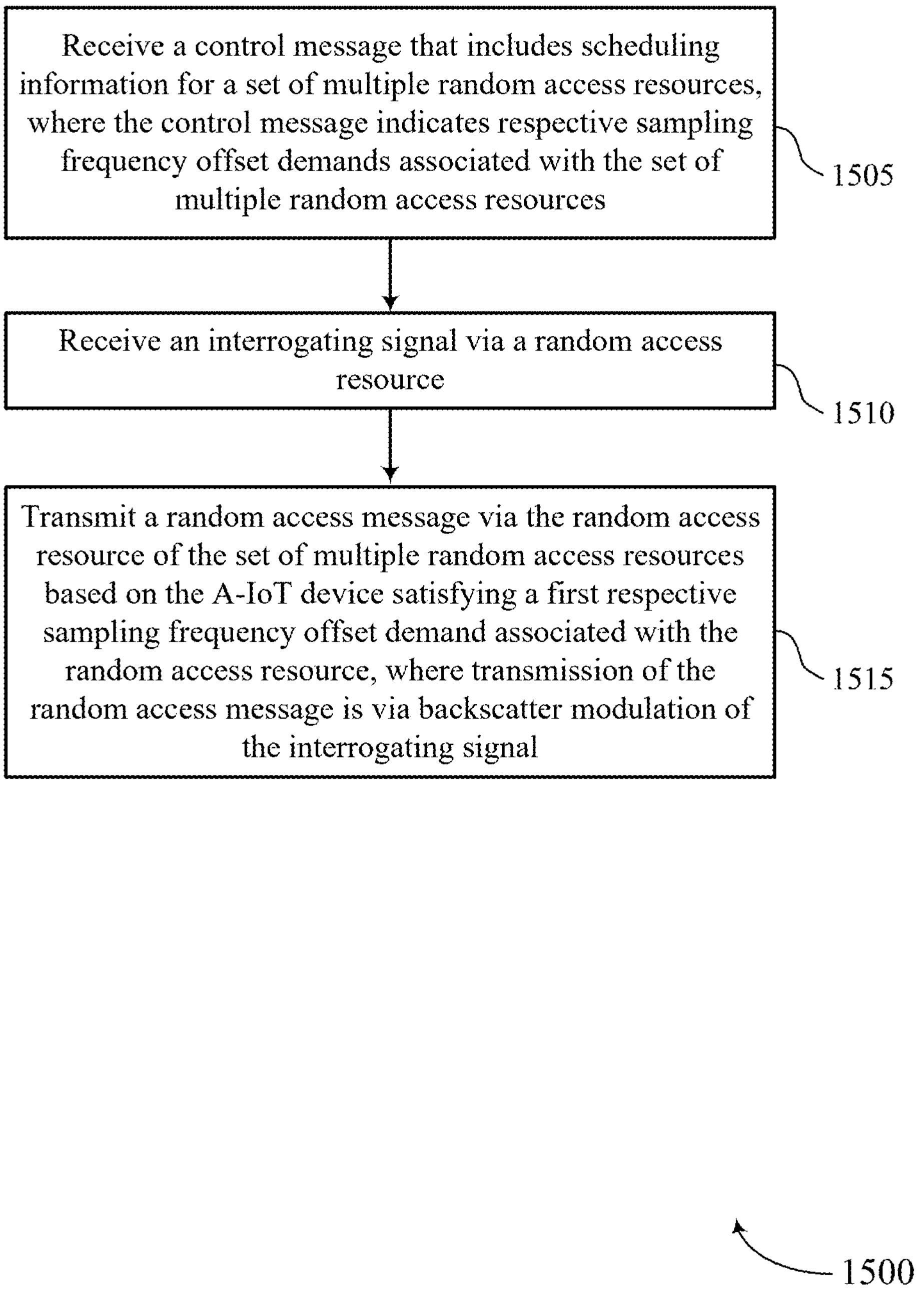

FIG. 15 shows a flowchart illustrating a method 1500 that supports random access resource selection based on SFO in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving a control message that includes scheduling information for a set of multiple random access resources, where the control message indicates respective SFO demands associated with the set of multiple random access resources. The operations of 1505 may be performed in accordance with examples as disclosed herein. In some examples, aspects of the operations of 1505 may be performed by a random access resource scheduling manager 725 as described with reference to FIG. 7.

At 1510, the method may include receiving an interrogating signal via a random access resource. The operations of 1510 may be performed in accordance with examples as disclosed herein. In some examples, aspects of the operations of 1510 may be performed by a backscatter modulation manager 760 as described with reference to FIG. 7.

At 1515, the method may include transmitting a random access message via the random access resource of the set of multiple random access resources based on the A-IoT device satisfying a first respective SFO demand associated with the random access resource, where transmission of the random access message is via backscatter modulation of the interrogating signal. The operations of 1515 may be performed in accordance with examples as disclosed herein. In some examples, aspects of the operations of 1515 may be performed by a random access message manager 730 as described with reference to FIG. 7.

Figure 16:
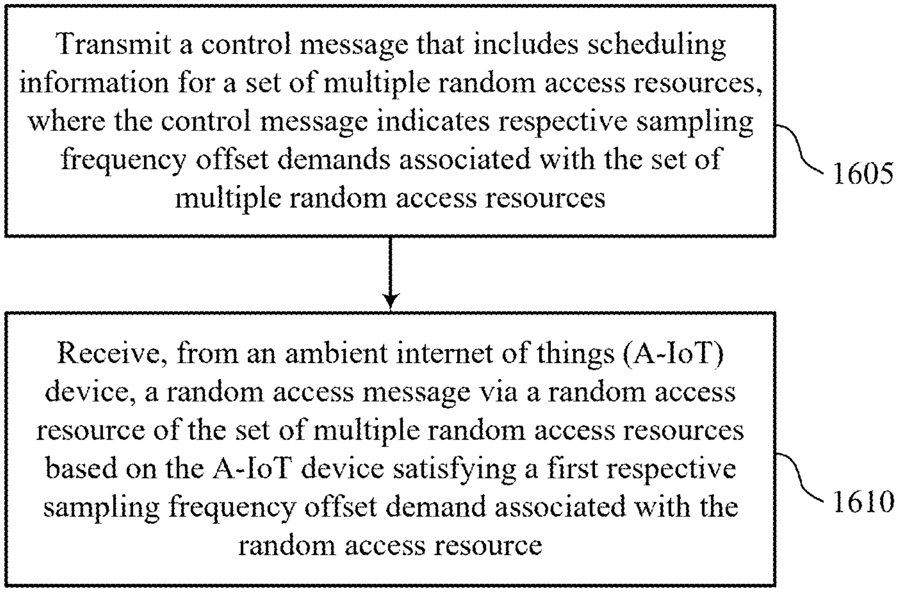

FIG. 16 shows a flowchart illustrating a method 1600 that supports random access occasion selection based on SFO in accordance with one or more aspects of the present disclosure. The operations of the method 1600 may be implemented by a UE or a network entity or its components as described herein. For example, the operations of the method 1600 may be performed by a UE 115 as described with reference to FIGS. 1 through 8 or a network entity as described with reference to FIGS. 1 through 4 and 9 through 12. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1605, the method may include transmitting a control message that includes scheduling information for a set of multiple random access resources, where the control message indicates respective SFO demands associated with the set of multiple random access resources. The operations of 1605 may be performed in accordance with examples as disclosed herein. In some examples, aspects of the operations of 1605 may be performed by a random access resource scheduling manager 725 or a Random Access Resource Scheduling Manager 1125 as described with reference to FIGS. 7 and 11.

At 1610, the method may include receiving, from an A-IoT device, a random access message via a random access resource of the set of multiple random access resources based on the A-IoT device satisfying a first respective SFO demand associated with the random access resource. The operations of 1610 may be performed in accordance with examples as disclosed herein. In some examples, aspects of the operations of 1610 may be performed by a random access message manager 730 or a Random Access Message Manager 1130 as described with reference to FIGS. 7 and 11.

The following provides an overview of aspects of the present disclosure:

Aspect 1: A method for wireless communications at an A-IoT device, comprising: receiving a control message that includes scheduling information for a plurality of random access resources, wherein the control message indicates respective SFO demands associated with the plurality of random access resources; and transmitting a random access message via a random access resource of the plurality of random access resources based at least in part on the A-IoT device satisfying a first respective SFO demand associated with the random access resource.

Aspect 2: The method of aspect 1, further comprising: selecting a subset of random access resources from the plurality of random access resources based at least in part on the A-IoT device satisfying the first respective SFO demand associated with each of the subset of random access resources; and randomly selecting the random access resource from the subset of random access resources.

Aspect 3: The method of any of aspects 1 through 2, wherein receiving the control message comprises: receiving the control message that includes the scheduling information that indicates a first subset of random access channel resources of the plurality of random access resources are scheduled in a first time resource and a second subset of random access channel resources of the plurality of random access resources are scheduled in a second time resource, wherein the control message indicates that the first subset of random access channel resources are associated with a first SFO demand, and wherein the control message indicates that the second subset of random access channel resources are associated with a second respective SFO demand.

Aspect 4: The method of aspect 3, wherein the first time resource is prior to the second time resource, and the first respective SFO demand is less strict than the second respective SFO demand.

Aspect 5: The method of any of aspects 1 through 2, wherein transmitting the random access message comprises: repeating transmission of a preamble sequence in the random access resource, wherein the scheduling information indicates that the random access resource is scheduled in a first time resource and a first frequency resource, wherein the scheduling information indicates that a second random access resource is scheduled in the first time resource and a second frequency resource, and wherein the first respective SFO demand is less strict than a second respective SFO demand offset associated with the second random access resource.

Aspect 6: The method of any of aspects 1 through 5, wherein receiving the control message comprises: receiving an indication of a respective sequence length associated with the plurality of random access resources, wherein transmitting the random access message comprises transmitting the random access message using a first respective sequence length associated with the random access resource.

Aspect 7: The method of any of aspects 1 through 6, wherein receiving the control message comprises: receiving an indication of a respective quantity of sequences associated with the plurality of random access resources, wherein transmitting the random access message comprises transmitting the random access message using a code division multiplexing parameter in accordance with a first respective quantity of sequences associated with the random access resource.

Aspect 8: The method of aspect 7, wherein the first respective quantity of sequences is one based at least in part on the first respective SFO demand exceeding a threshold.

Aspect 9: The method of any of aspects 1 through 8, wherein receiving the control message comprises: receiving the control message that indicates respective device types associated with the plurality of random access resources, wherein the control message indicates the respective SFO demands via indication of the respective device types.

Aspect 10: The method of any of aspects 1 through 9, further comprising: receiving an interrogating signal via the random access resource, wherein transmission of the random access message is via backscatter modulation of the interrogating signal.

Aspect 11: The method of any of aspects 1 through 10, further comprising: receiving a second random access message in response to the random access message, wherein the second random access message indicates a resource for transmission of an identifier of the A-IoT device; and transmitting a third random access message via the resource, wherein the third random access message indicates the identifier of the A-IoT device.

Aspect 12: A method for wireless communications at a reader device, comprising: transmitting a control message that includes scheduling information for a plurality of random access resources, wherein the control message indicates respective SFO demands associated with the plurality of random access resources; and receiving, from an A-IoT device, a random access message via a random access resource of the plurality of random access resources based at least in part on the A-IoT device satisfying a first respective SFO demand associated with the random access resource.

Aspect 13: The method of aspect 12, wherein transmitting a control message comprises: transmitting the control message that includes the scheduling information that indicates a first subset of random access channel resources of the plurality of random access resources are scheduled in a first time resource and a second subset of random access channel resources of the plurality of random access resources are scheduled in a second time resource, wherein the control message indicates that the first subset of random access channel resources are associated with a first SFO demand, and wherein the control message indicates that the second subset of random access channel resources are associated with a second respective SFO demand.

Aspect 14: The method of aspect 13, wherein the first time resource is prior to the second time resource, and the first respective SFO demand is less strict than the second respective SFO demand.

Aspect 15: The method of any of aspects 12 through 13, wherein receiving the random access message comprises: receiving repeated transmissions of a preamble sequence in the random access resource, wherein the scheduling information indicates that the random access resource is scheduled in a first time resource and a first frequency resource, wherein the scheduling information indicates that a second random access resource is scheduled in the first time resource and a second frequency resource, and wherein the first respective SFO demand is less strict than a second respective SFO demand offset associated with the second random access resource.

Aspect 16: The method of any of aspects 12 through 15, wherein transmitting a control message comprises: transmitting an indication of a respective sequence length associated with the plurality of random access resources, wherein transmitting the random access message comprises transmitting the random access message using a first respective sequence length associated with the random access resource.

Aspect 17: The method of any of aspects 12 through 16, wherein transmitting a control message comprises: transmitting an indication of a respective quantity of sequences associated with the plurality of random access resources, wherein transmitting the random access message comprises transmitting the random access message using a code division multiplexing parameter in accordance with a first respective quantity of sequences associated with the random access resource.

Aspect 18: The method of aspect 17, wherein the first respective quantity of sequences is one based at least in part on the first respective SFO demand exceeding a threshold.

Aspect 19: The method of any of aspects 12 through 18, wherein transmitting a control message comprises: transmitting the control message that indicates respective device types associated with the plurality of random access resources, wherein the control message indicates the respective SFO demands via indication of the respective device types.

Aspect 20: The method of any of aspects 12 through 19, further comprising: transmitting an interrogating signal via the random access resource, wherein reception of the random access message is via backscatter modulation of the interrogating signal.

Aspect 21: The method of any of aspects 12 through 20, further comprising: transmitting a second random access message in response to the random access message, wherein the second random access message indicates a resource for transmission of an identifier of the A-IoT device; and receiving, from the A-IoT device, a third random access message via the resource, wherein the third random access message indicates the identifier of the A-IoT device.

Aspect 22: An A-IoT device for wireless communications, comprising one or more memories storing processor-executable code, and one or more processors coupled with the one or more memories and individually or collectively operable to execute the code to cause the A-IoT device to perform a method of any of aspects 1 through 11.

Aspect 23: An A-IoT device for wireless communications, comprising at least one means for performing a method of any of aspects 1 through 11.

Aspect 24: A non-transitory computer-readable medium storing code for wireless communications, the code comprising instructions executable by one or more processors to perform a method of any of aspects 1 through 11.

Aspect 25: A reader device for wireless communications, comprising one or more memories storing processor-executable code, and one or more processors coupled with the one or more memories and individually or collectively operable to execute the code to cause the reader device to perform a method of any of aspects 12 through 21.

Aspect 26: A reader device for wireless communications, comprising at least one means for performing a method of any of aspects 12 through 21.

Aspect 27: A non-transitory computer-readable medium storing code for wireless communications, the code comprising instructions executable by one or more processors to perform a method of any of aspects 12 through 21.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at an ambient internet of things (A-IoT) device, comprising:

receiving a control message that includes scheduling information for a plurality of random access resources, wherein the control message indicates respective sampling frequency offset demands associated with the plurality of random access resources; and transmitting a random access message via a random access resource of the plurality of random access resources based at least in part on the A-IoT device satisfying a first respective sampling frequency offset demand associated with the random access resource.

2. The method of claim 1, further comprising:

selecting a subset of random access resources from the plurality of random access resources based at least in part on the A-IoT device satisfying the first respective sampling frequency offset demand associated with each of the subset of random access resources; and randomly selecting the random access resource from the subset of random access resources.

3. The method of claim 1, wherein receiving the control message comprises:

receiving the control message that includes the scheduling information that indicates a first subset of random access channel resources of the plurality of random access resources are scheduled in a first time resource and a second subset of random access channel resources of the plurality of random access resources are scheduled in a second time resource, wherein the control message indicates that the first subset of random access channel resources are associated with a first sampling frequency offset demand, and wherein the control message indicates that the second subset of random access channel resources are associated with a second respective sampling frequency offset demand.

4. The method of claim 3, wherein:

the first time resource is prior to the second time resource, and the first respective sampling frequency offset demand is less strict than the second respective sampling frequency offset demand.

5. The method of claim 1, wherein transmitting the random access message comprises:

repeating transmission of a preamble sequence in the random access resource, wherein the scheduling information indicates that the random access resource is scheduled in a first time resource and a first frequency resource, wherein the scheduling information indicates that a second random access resource is scheduled in the first time resource and a second frequency resource, and wherein the first respective sampling frequency offset demand is less strict than a second respective sampling frequency offset demand offset associated with the second random access resource.

6. The method of claim 1, wherein receiving the control message comprises:

receiving an indication of a respective sequence length associated with the plurality of random access resources, wherein transmitting the random access message comprises transmitting the random access message using a first respective sequence length associated with the random access resource.

7. The method of claim 1, wherein receiving the control message comprises:

receiving an indication of a respective quantity of sequences associated with the plurality of random access resources, wherein transmitting the random access message comprises transmitting the random access message using a code division multiplexing parameter in accordance with a first respective quantity of sequences associated with the random access resource.

8. The method of claim 7, wherein the first respective quantity of sequences is one based at least in part on the first respective sampling frequency offset demand exceeding a threshold.

9. The method of claim 1, wherein receiving the control message comprises:

receiving the control message that indicates respective device types associated with the plurality of random access resources, wherein the control message indicates the respective sampling frequency offset demands via indication of the respective device types.

10. The method of claim 1, further comprising:

receiving an interrogating signal via the random access resource, wherein transmission of the random access message is via backscatter modulation of the interrogating signal.

11. The method of claim 1, further comprising:

receiving a second random access message in response to the random access message, wherein the second random access message indicates a resource for transmission of an identifier of the A-IoT device; and transmitting a third random access message via the resource, wherein the third random access message indicates the identifier of the A-IoT device.

12. An ambient internet of things (A-IoT) device, comprising:

one or more memories storing processor-executable code; and one or more processors coupled with the one or more memories and individually or collectively operable to execute the code to cause the A-IoT device to:

receive a control message that includes scheduling information for a plurality of random access resources, wherein the control message indicates respective sampling frequency offset demands associated with the plurality of random access resources; and transmit a random access message via a random access resource of the plurality of random access resources based at least in part on the A-IoT device satisfying a first respective sampling frequency offset demand associated with the random access resource.

13. The A-IoT device of claim 12, wherein the one or more processors are individually or collectively further operable to execute the code to cause the A-IoT device to:

select a subset of random access resources from the plurality of random access resources based at least in part on the A-IoT device satisfying the first respective sampling frequency offset demand associated with each of the subset of random access resources; and randomly select the random access resource from the subset of random access resources.

14. The A-IoT device of claim 12, wherein, to receive the control message, the one or more processors are individually or collectively operable to execute the code to cause the A-IoT device to:

receive the control message that includes the scheduling information that indicates a first subset of random access channel resources of the plurality of random access resources are scheduled in a first time resource and a second subset of random access channel resources of the plurality of random access resources are scheduled in a second time resource, wherein the control message indicates that the first subset of random access channel resources are associated with a first sampling frequency offset demand, and wherein the control message indicates that the second subset of random access channel resources are associated with a second respective sampling frequency offset demand.

15. The A-IoT device of claim 14, wherein:

the first time resource is prior to the second time resource, and the first respective sampling frequency offset demand is less strict than the second respective sampling frequency offset demand.

16. The A-IoT device of claim 12, wherein, to transmit the random access message, the one or more processors are individually or collectively operable to execute the code to cause the A-IoT device to:

repeat transmission of a preamble sequence in the random access resource, wherein the scheduling information indicates that the random access resource is scheduled in a first time resource and a first frequency resource, wherein the scheduling information indicates that a second random access resource is scheduled in the first time resource and a second frequency resource, and wherein the first respective sampling frequency offset demand is less strict than a second respective sampling frequency offset demand offset associated with the second random access resource.

17. The A-IoT device of claim 12, wherein, to receive the control message, the one or more processors are individually or collectively operable to execute the code to cause the A-IoT device to:

receive an indication of a respective sequence length associated with the plurality of random access resources, wherein transmitting the random access message comprises transmitting the random access message using a first respective sequence length associated with the random access resource.

18. The A-IoT device of claim 12, wherein, to receive the control message, the one or more processors are individually or collectively operable to execute the code to cause the A-IoT device to:

receive an indication of a respective quantity of sequences associated with the plurality of random access resources, wherein transmitting the random access message comprises transmitting the random access message using a code division multiplexing parameter in accordance with a first respective quantity of sequences associated with the random access resource.

19. The A-IoT device of claim 18, wherein the first respective quantity of sequences is one based at least in part on the first respective sampling frequency offset demand exceeding a threshold.

20. A non-transitory computer-readable medium storing code for wireless communications by an ambient internet of things (A-IoT) device, the code comprising instructions executable by one or more processors to:

receive a control message that includes scheduling information for a plurality of random access resources, wherein the control message indicates respective sampling frequency offset demands associated with the plurality of random access resources; and transmit a random access message via a random access resource of the plurality of random access resources based at least in part on the A-IoT device satisfying a first respective sampling frequency offset demand associated with the random access resource.

* * * * *